United States Patent
Tajalli et al.

(10) Patent No.: US 7,657,927 B2
(45) Date of Patent: Feb. 2, 2010

(54) BEHAVIOR-BASED HOST-BASED INTRUSION PREVENTION SYSTEM

(75) Inventors: Homayoon Tajalli, Ellicott City, MD (US); Jeffrey J. Graham, Olney, MD (US); Timothy J. Fraser, Olney, MD (US)

(73) Assignee: Symantec Corporation, Mountain View, CA (US)

( * ) Notice: Subject to any disclaimer, the term of this patent is extended or adjusted under 35 U.S.C. 154(b) by 953 days.

(21) Appl. No.: 11/009,704

(22) Filed: Dec. 13, 2004

(65) Prior Publication Data

US 2005/0108578 A1    May 19, 2005

Related U.S. Application Data

(63) Continuation of application No. 10/345,137, filed on Jan. 16, 2003, now abandoned.

(51) Int. Cl.
*H04L 29/00* (2006.01)

(52) U.S. Cl. .............................................. 726/2; 726/1
(58) Field of Classification Search ...................... None
See application file for complete search history.

(56) References Cited

U.S. PATENT DOCUMENTS

| | | | |
|---|---|---|---|
| 5,295,266 A * | 3/1994 | Hinsley et al. ............... | 718/101 |
| 5,412,717 A | 5/1995 | Ficher | |
| 5,978,484 A * | 11/1999 | Apperson et al. ............. | 705/54 |
| 6,158,010 A * | 12/2000 | Moriconi et al. ............... | 726/1 |
| 6,505,300 B2 | 1/2003 | Chan et al. | |
| 7,103,914 B2 * | 9/2006 | Focke et al. ................... | 726/22 |
| 2002/0147923 A1 | 10/2002 | Dotan | |

* cited by examiner

*Primary Examiner*—Minh Dinh
(74) *Attorney, Agent, or Firm*—Meyertons Hood Kivlin Kowert & Goetzel, P.C.

(57) ABSTRACT

A method of protecting a system from attack that includes monitoring processes running on a system, identifying behavior of the processes and attributes of the processes, grouping the processes into process sets based on commonality of attributes, and generating behavior control descriptions for each process set.

24 Claims, 13 Drawing Sheets

US 7,657,927 B2

BEHAVIOR-BASED HOST-BASED INTRUSION PREVENTION SYSTEM

CROSS REFERENCE TO RELATED APPLICATIONS

This application is a continuation of U.S. patent application Ser. No. 10/345,137, filed on Jan. 16, 2003, which is incorporated herein by reference in its entirety.

BACKGROUND OF THE INVENTION

1. Field of the Invention

The present invention relates to host-based protection, and more particularly, to host-based protection that prevents attacks based on application behavior.

2. Related Art

There is a growing awareness that existing security infrastructure that guards the perimeter (e.g., firewalls) or uses signatures (e.g., anti-virus and intrusion detection) is no longer adequate protection against new and unknown attacks or hostile insiders. With the advent of the Internet and organizational mandates to open internal systems to customers, suppliers and partners, the concept of a perimeter has changed forever. Because of these mandates and the inability of perimeter security to protect applications and servers, critical computing resources are exposed to severe and frequent damage.

When a new attack appears (and all attacks are new and unknown at first) it slips past existing defenses (firewall, intrusion detection, and anti-virus software) and exploits some vulnerability in an application or operating system (e.g., buffer overflow) and then causes damage to critical computing resources. Historical data about operating system and application vulnerabilities, viruses, worms and insider attacks in the past 3 years shows that the majority of attacks obtain some system level privilege (e.g., administrator, or root) they should not have. Once the attack or attacker gains this privilege, it can then modify system files, change registry settings, access devices, and control network connections, and steal or alter proprietary information. In the case of a worm or virus, if a new attack propagates quickly, as many do (e.g., NIMDA, Melissa, I Love You), it damages thousands of servers before the defenses can be updated. In addition to automated attacks, such as viruses and worms, there is a significant risk from malicious insiders. Existing security products provide little defense against a malicious insider with legitimate privileges doing damage to servers. Viruses, worms and hostile insiders cause substantial damage and loss of productivity and proprietary information and require each of the damaged servers to be repaired by reformatting, reconfiguring, recovering data or even replacing the server.

As illustrated in FIG. 1, the existing perimeter security solutions solve some, but not all, of these problems. Each solution has specific strengths and weaknesses:

Network firewalls 101 provide perimeter defense, ostensibly keeping malicious activity out of the network. This type of defense does not account for damage caused from inside the network. Many studies have shown that internal attacks account for a large percentage of damage. Additionally, network firewalls work by examining network behavior, but even legitimate network traffic can take advantage of application vulnerabilities.

Intrusion detection systems (IDS) 102 work by examining various types of system behavior, e.g., network traffic and system logs, looking for patterns that indicate attacks. Typically IDS's 102 define attacks based on signatures of known attacks or on vague notions of "normal" activity. Signature-based systems only protect against attacks seen previously. Definitions of normal activity must be very loose to avoid generating false alarms.

Anti-virus scanners 103 examine files or email messages and look for matches to known attack signatures. As with all signature-based products, these scanners 103 cannot deal with a new type of attack until it is known, a new signature is defined and then distributed by the vendor. Anti-virus scanners 103 also cannot detect attacks that are not carried in files or email messages.

Security, however, is not a top priority for application software vendors in today's market. Market pressures force the vendors to deliver new features so rapidly that it is impossible to build software without inherent security flaws. The requirements for today's applications are so complex that simply delivering a working product within deadlines is difficult. The additional effort required to create a secure design and perform security testing is not practical.

Even if application vendors decided to make security a top priority for their products, there are significant barriers to developing secure applications. Most software developers do not have the expertise to design and build secure software. Training developers in these skills will not happen overnight. Additionally, secure applications are pointless without a secure foundation to host them. Today's operating systems do not provide a secure foundation to protect applications or allow them to protect themselves. Operating system vendors release new security patches each week to improve their products. But applying patches is not a strategic solution, because they are published only after the fact, only address known flaws, and are very cumbersome to deploy.

Even solving these problems cannot guarantee freedom from attacks. Enterprises today require complex software that permits interaction with a wide variety of other organizations for needs such as supply chain management, messaging, and customer relationship management. There will always be people who misuse legitimate features of the software and cause damage to critical information. The misuse might be accidental or malicious but the result is the same—loss of information or services and downtime to which critical are the enterprise.

Independent reports published by Computer Security Institute/FBI, CERT/CC, and Gartner determined that known users accessing the corporate network from the outside cause 70% of all security breaches; 57% of the breaches are unintentional and the balance are malicious. Further, because of the significant rise in identity theft, it is impossible to be certain whether or not a known user is the legitimate user or an imposter exploiting the access rights of the legitimate user's identity. This means that the definition of an insider has come to mean virtually any customer, supplier, partner, consultant, employee or identity thief who has access to the network. To make things even more difficult, the corporate mandate is to further open systems to access from anywhere, anyway and at anytime. This means that applications will need to be more extensible and as a consequence more complex and vulnerable.

A need therefore exists to enhance existing security infrastructure with technology that prevents new and unknown attacks and hostile insiders from compromising critical computing resources.

There has been significant research in the past 30 years related to adding system-wide security controls to operating systems. Often the solutions require modification of the operating system itself to support additional data structures or system calls. These modifications are necessary either for completeness or efficiency or both. By requiring modification to the operating system, these solutions limit themselves to vendors who distribute their source code, and even in those cases, since they aren't part of the basic product development process, the solutions typically lag behind the most current versions of the operating systems.

Most of the solutions also create system-wide tables of access control information. This limits their usefulness in complex system deployments. Since every change to the system-wide information has the potential to affect every other part, it is impractical to create very large or complex configurations. Beyond a certain size, the author will not be able to determine whether a change has detrimental ramifications on another part of the configuration. For this reason, the previous solutions either never reached commercial viability, or if they did, only provide simple, basic configurations and cannot be easily expanded for complex situations.

Other solutions currently available concentrate on a small area of protection, e.g., HTTP filtering or network connection control. While they do a good job within their target area, they leave large portions of the system unprotected. As a result, customers desiring overall protection of their computer systems must deploy a combination of products, each dealing with a part of the security problem.

SUMMARY OF THE INVENTION

The present invention is directed to a behavioral-based host-based system that substantially obviates one or more of the problems and disadvantages of the related art.

There is provided a method of protecting a system from attack including monitoring processes running on a system, identifying behavior of the processes and attributes of the processes, grouping the processes into process sets based on commonality of attributes, and generating behavior control descriptions for each process set.

In another aspect there is provided a method of protecting a system from unauthorized use including decomposing processes running on a system into a plurality of process sets, such that each process set has a corresponding behavior control description, and controlling access to system resources by each process based on a behavior control description for the process set to which the process belongs.

In another aspect there is provided a method of protecting a system from unauthorized use including identifying processes running on a system, such that each process has an independent behavior control description and controlling access to system resources by each process based on the behavior control description for the process.

Additional features and advantages of the invention will be set forth in the description that follows, and in part will be apparent from the description, or may be learned by practice of the invention. The advantages of the invention will be realized and attained by the structure and particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to illustrate exemplary embodiments of the invention and are incorporated in and constitute a part of this specification, illustrate embodiments of the invention and together with the description serve to explain the principles of the invention. In the drawings.

DETAILED DESCRIPTION OF EMBODIMENTS OF THE INVENTION

Figure 1:
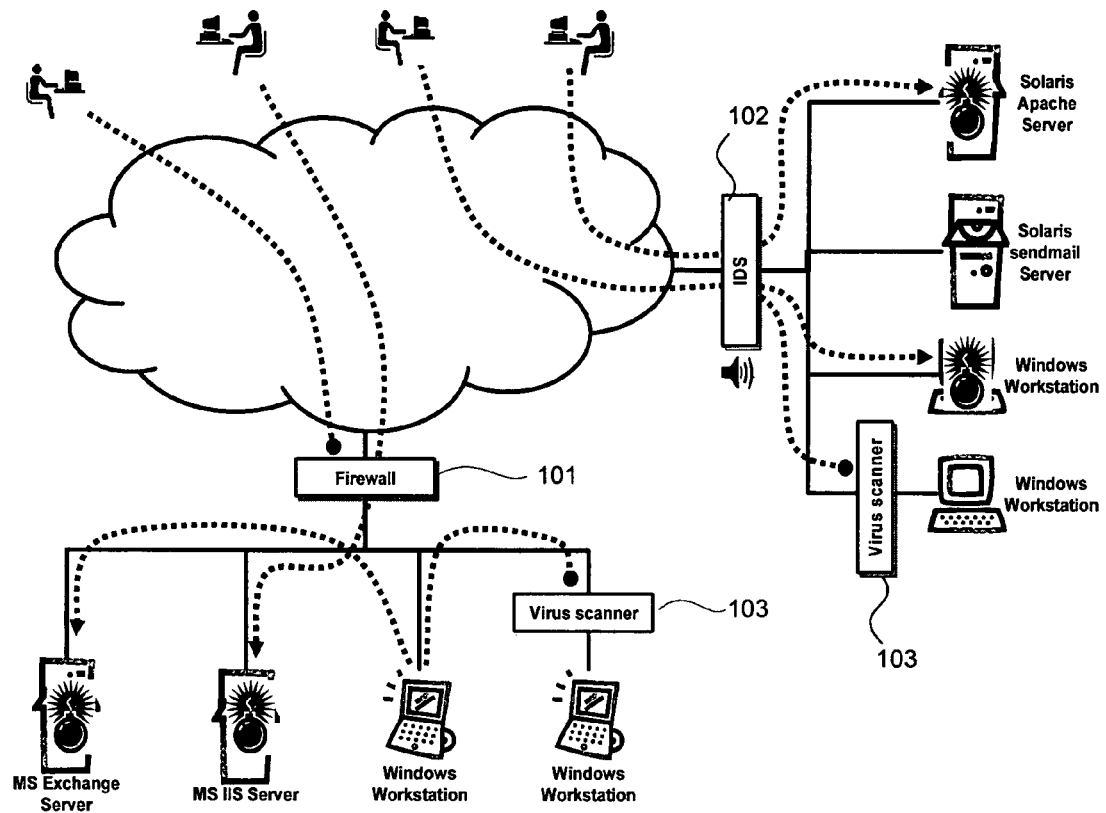
FIG. 1 shows conventional perimeter security approaches.

Reference will now be made in detail to the embodiments of the present invention, examples of which are illustrated in the accompanying drawings.

---

TABLE OF CONTENTS

BEHAVIOR-BASED HOST-BASED InTRUSION PREVENTION SYSTEM
    cross reference to related applications
1.0 Introduction
2.0 Requirements for a successful behavioral-based firewall
3.0 The APPFIRE ™ Solution
4.0 Architectural Overview
    4.1 APPFIRE ™ Agent
    4.2 Management Infrastructure
    4.3 APPFIRE ™ Manager
    4.4 The APPFIRE ™ Enterprise Manager
    4.5 The APPFIRE ™ Authoring Environment
5.0 System Behavior Policies
    5.1 Modular Policy Definition
    5.2 Process Sets
    5.3 Behavior Control Descriptions (BCDs)
    5.4 The APPFIRE ™ Profiler
6.0 J2EE Application Server
7.0 System resources access control
8.0 Example—CodeRed worm
9.0 APPFIRE ™ Case Studies
    9.1 Protecting against Malicious Employees
    9.2 Protecting Custom Applications
    9.3 Protecting Public IIS Servers
    9.4 Managing Policy in Large Organizations
    9.5 Reducing the Time-Criticality of Patches
BEHAVIOR-BASED HOST-BASED InTRUSION PREVENTION SYSTEM
ABSTRACT OF THE DISCLOSURE

---

1.0 Introduction

APPFIRE™ is an example of an application firewall, described in detail below, that protects critical computing resources from the severe, frequent and costly damage caused by new and unknown attacks and hostile insiders. Three important architectural decisions have a significant impact on the ability of APPFIRE™ to meet the requirements for protection, ease of use, scalability, flexibility, and extensibility:
Behavior-based rather than signature-based control
A modular approach to policy creation and management
A J2EE Application Server-based architecture 2.0 Requirements for a Successful Behavioral-Based Firewall The three architectural decisions for APPFIRE™ of behavior-based control, modular policy model, and J2EE Application Server allow the APPFIRE™ application firewall to meet the requirements below and thus provide a real enterprise-class solution:

Prevent unknown attacks: APPFIRE™'s behavior-based policy philosophy does not depend on knowing the method of attack. It defines appropriate behavior based on the intended use of an application. If the application exhibits inappropriate behavior for any reason, APPFIRE™ will prevent it.

Ease of Use: APPFIRE™'s modular policy model allows an administrator to easily view and configure security policies in a series of small manageable tasks. The user interface provides three different views of a policy (simple, graphical, and source) allowing administrators to choose the level of abstraction most appropriate for their purposes at any time. Therefore APPFIRE™ meets scalability and ease of use requirements by allowing an administrator to see exactly what a Behavior Control Description (BCD) affects and its relationship to other parts of the policy, without the need to understand all aspects of the policy and system. By making APPFIRE™'s policy creation and management framework modular and graphical, an organization can easily create and modify BCDs and policies. The APPFIRE™ management framework is designed to plug into existing management frameworks (i.e., Microsoft Operations Manager and Systems Management Server). This further reduces the learning curve by allowing administrators to continue using management tools they already understand. APPFIRE™'s pre-defined BCDs for popular applications and OS's provide true "out of the box" value for novice administrators or organizations that do not want to create or modify policy.

Scalability: The J2EE Application Server architecture allows an enterprise to expand the Management Infrastructure (discussed below) as their needs grow. It allows them to leverage existing resources, such as database or enterprise management frameworks, or use built-in APPFIRE™-provided components. The J2EE Application Server supports clustering and high-availability requirements common in large enterprises. The management user interface allows administrators to easily deal with large numbers of machines by grouping them and applying common policies to entire groups. The modular policy model allows creation of common policy building blocks that can be reused in policies throughout the enterprise.

Flexibility: The use of Java and the J2EE Application Server allows the management framework to run on multiple platforms. An enterprise can run the framework on whatever operating system they are most comfortable supporting, and it is database independent. The APPFIRE™ Agent software also supports multiple platforms, so an enterprise can protect any system. The language used to describe the policies (discussed below) supports a wide variety of resources, resource attributes and process attributes for use in Process Binding Rules (PBRs, see discussion below) and Behavior Control Descriptions (BCDs). This variety allows the policies to address both simple and complex application deployments.

Extensibility: the initial APPFIRE™ release focuses on controlling applications' access to resources. However, the modular policy model and the implementation are designed for easy extension to other types of protection schemes. The APPFIRE™ Profiler assists policy developers in extending policies with specific BCDs for new or custom-built applications.

3.0 The APPFIRE™ Solution

The APPFIRE™ application firewall can be implemented as an addition to an operating system or as an integrated part of an operating system. This flexibility increases the number of systems on which the invention can be implemented.

The APPFIRE™ application firewall allows modular specification of policy information. The policy configuration consists of multiple, independent behavior control descriptions and a set of process binding rules defining which processes are controlled by which behavior control descriptions. By avoiding a single system-wide configuration for all processes, the scope of changes is limited and more complex policies can be created.

The modular policy architecture also allows independent development of behavior-based controls for applications. Behavior control descriptions can be developed concurrently by several groups and combined with existing policies in a controlled fashion. This allows software vendors to develop APPFIRE™ behavior control descriptions to distribute with their products and know that when they are added to an existing APPFIRE™ policy on a customer's system the result will operate correctly. Similarly it allows consulting organizations to develop behavior control descriptions and add them to existing APPFIRE™ policies in an understandable fashion.

The APPFIRE™ application firewall looks at all aspects of a process' behavior. It does not focus on the use of a specific protocol or specific types of resources. It monitors all types of resources, e.g., files, registry, network, URLs, or any other type of resource that may become important for security protection. It can look at single actions, e.g., opening a file or a network connection. It can look at sequences of actions, e.g., attack signatures. It can also maintain state and control actions differently based on that state, e.g., once a network connection is opened, certain files can no longer be written. By not limiting itself to a subset of possible behaviors, the APPFIRE™ application firewall becomes suitable for any type of operating system or application.

The APPFIRE™ Agents accept configuration from a number of trusted sources. A basic implementation accepts policy from an authenticated Management Infrastructure. The Agents can also accept configuration from an application itself, e.g., applications built with .NET development tools can contain explicit information about resources they need and don't need. This information can be read and enforced by APPFIRE™ Agents. APPFIRE™ Agents can also assist operating systems that control application behavior based on licenses, e.g., Microsoft's planned Palladium architecture. Information provided by the operating system can be incorporated into the APPFIRE™ policy to strengthen the computing platform available to applications.

Figure 2:
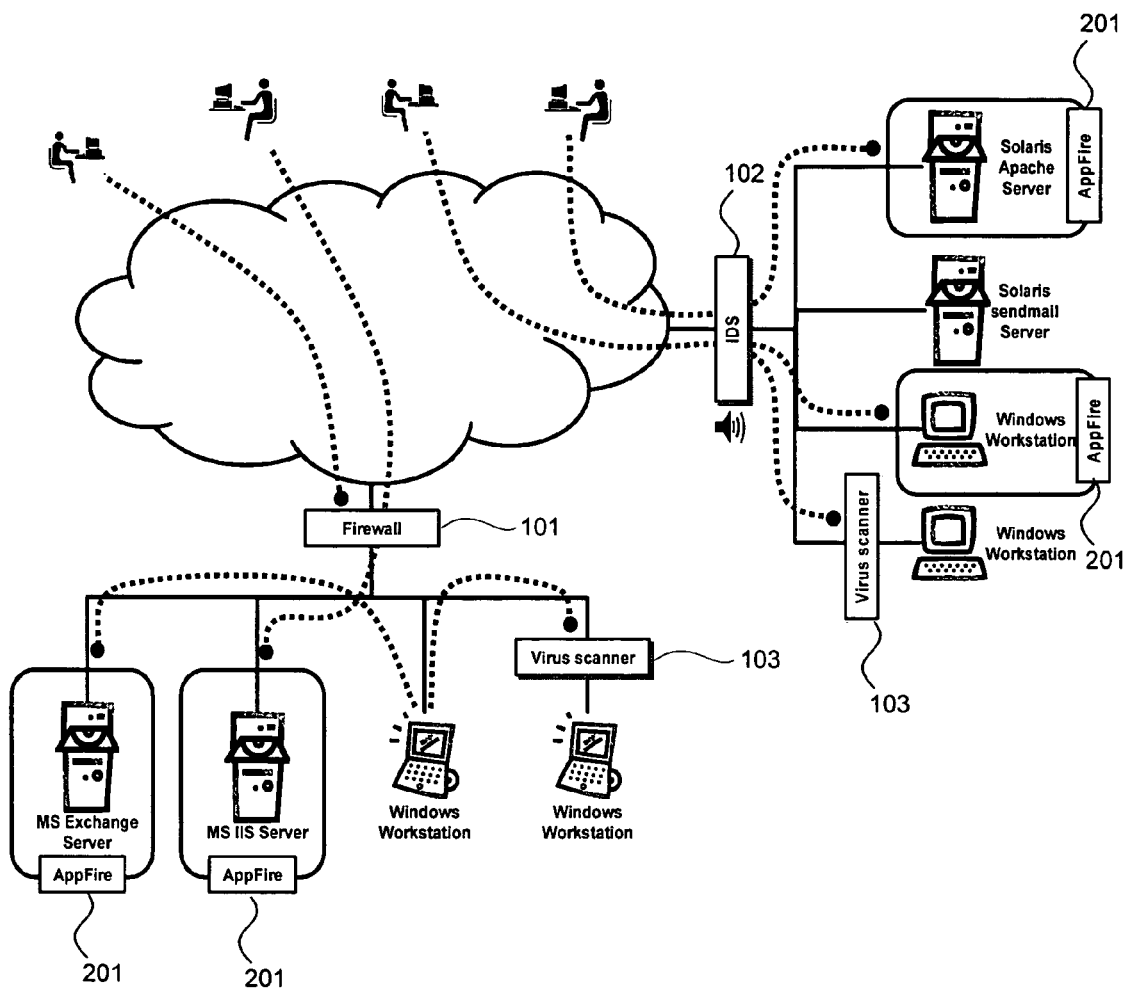
FIG. 2 shows how an APPFIRE™ application firewall fits into a system security approach.

The APPFIRE™ firewall 201, as shown in FIG. 2, provides an important new security capability. Rather than watching the activity happening around the application as the perimeter security products do, it watches the behavior of the application itself. By watching the behavior of an application, it can spot bad behavior as it happens and prevent it from causing damage. This behavior-based control creates a safe zone of operation around an application. The enterprise regains control of its applications.

The APPFIRE™ firewall 201 should be used in conjunction with other security products for a defense-in-depth, as illustrated in FIG. 2. The APPFIRE™ firewall 201 addresses the weaknesses of existing security products. Its general behavior-based controls are suitable for both servers and workstations, for any operating system, and for any application.

The APPFIRE™ firewall 201 uses Trusted Operating System concepts. Behavior control mechanisms are added to each target operating system. These mechanisms allow the APPFIRE™ firewall 201 to actively monitor any application and ensure compliance with the policy configured by the administrator. Predefined policies and BCDs are available for popular operating systems, e.g., Windows NT/2000/XP, and applications, e.g., MS Exchange, Internet Information Server, MS Outlook and MS Internet Explorer. In addition, the APPFIRE™ firewall 201 makes it easy to adapt policies for environmentally unique requirements. The APPFIRE™ firewall 201 then allows each application to execute in its own confined domain having access to only the resources that it needs to perform its intended function and nothing more.

The behavior controls are implemented at a kernel level and cannot be bypassed by any application, including those that are considered privileged by the host operating system. The APPFIRE™ firewall 201 includes a user-friendly BCD editor, scalable remote management and reporting features and the ability to integrate with third-party enterprise management consoles. These capabilities make the APPFIRE™ firewall 201 suitable for wide deployment in an enterprise of any size.

The initial APPFIRE™ firewall 201 release will support Windows Server, Exchange Server and IIS. APPFIRE™ is also intended to support Windows Workstation, MS Outlook, MS Internet Explorer and UNIX servers and applications.

The sections below explain the architecture in more detail. It is noted that in various embodiments, a storage medium may store program instructions executable by a plurality of computers to perform the functionality as described herein below.

4.0 Architectural Overview

Figure 3:
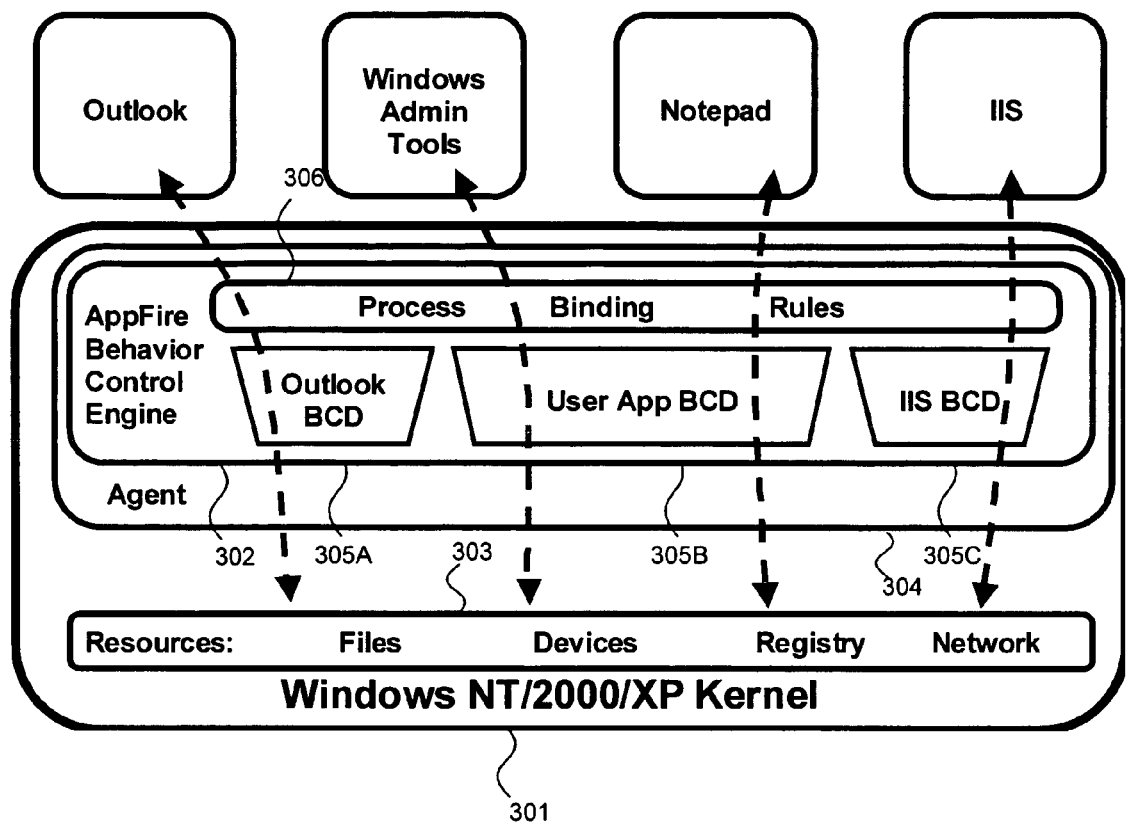
FIG. 3 shows an illustration of a Windows kernel environment and how an APPFIRE™ Agent fits within it.
Figure 4:
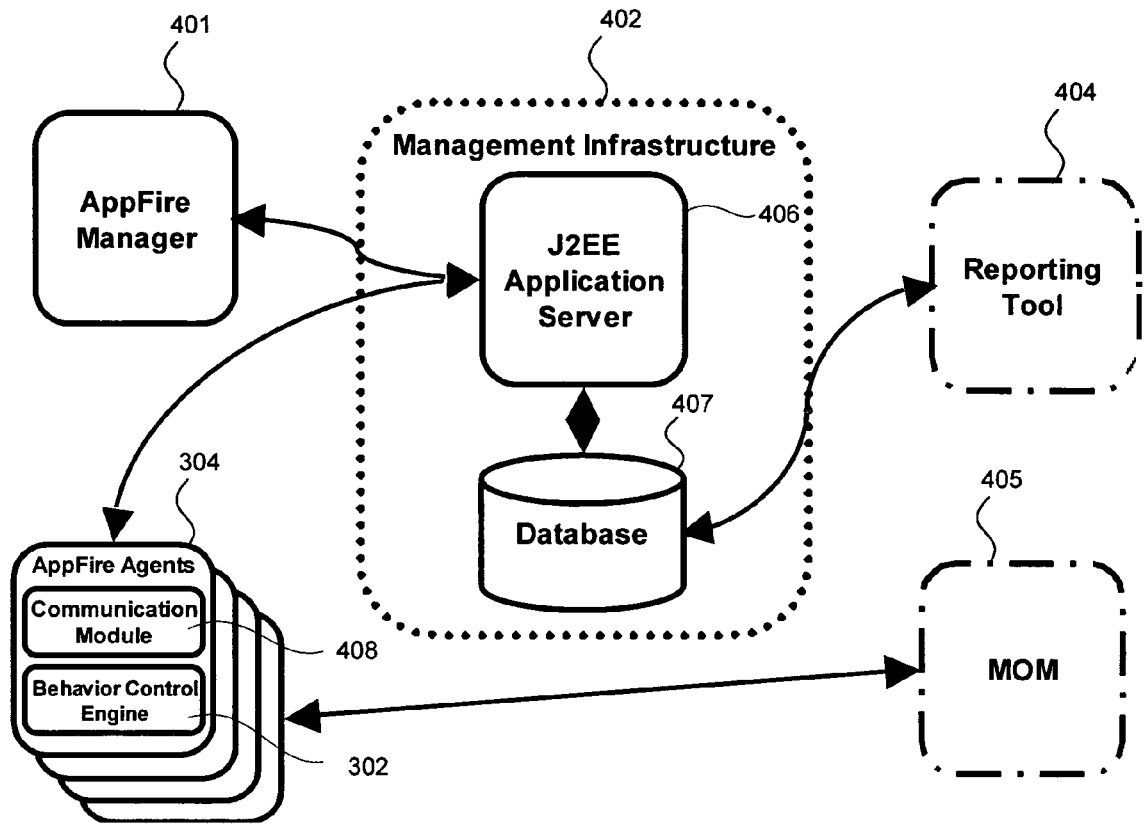
FIG. 4 shows a relationship between the various APPFIRE™ components.

The APPFIRE™ firewall 201 architecture includes the following main components, as shown in FIGS. 3 and 4:

APPFIRE™ Agent: 304 behavior control engine 302 within the Agent 304 monitors applications' use of system resources based on the System Behavior Policy; makes itself non-bypassable; provides an interface to the Management Infrastructure 402 (see FIG. 4). FIG. 3 shows the use of BCDs 305 from the policy to monitor and control how applications use system resources.

Management Infrastructure 402: provides central storage for APPFIRE™ system data; provides interfaces for managers and Agents to store and retrieve data; supports clustering for additional capacity and redundancy.

APPFIRE™ Manager: controls configuration of APPFIRE™ Agents and includes efficient and secure communication channels and advanced customization capability.

APPFIRE™ System Behavior Policies (policies) define the permitted behavior of applications running on the Agents 304. Policies contain Process Binding Rules 306 that group the applications on the system into process sets and Behavior Control Descriptions 305 that define the permitted behavior of applications in each process set. A policy may contain as few as one process set and one BCD or as many process sets and BCDs as necessary to provide the protection desired.

Each of these components is designed to support multiple operating system platforms. The capabilities they provide are general enough to extend to a variety of applications and environments.

A common APPFIRE™ firewall 201 installation would deploy the Manager 401 on several administrators' workstations, the Management Infrastructure 402 on a dedicated server, and the APPFIRE™ Agents 304 on the organization's critical servers. However, the architecture is extremely flexible in order to support a variety of deployment scenarios:

For extremely large installations, the Management Infrastructure 402 could be split onto two servers, one dedicated to the J2EE Application Server 406 and one to the database 407. Each of those pieces could be clustered as well, to provide further capacity.

For organizations with an existing database server, the J2EE Application Server 406 portion of the Management Infrastructure 402 could be installed on a dedicated server and configured to use the existing database on a separate system. Alternatively the J2EE Application Server 406 could be installed on the existing database server.

For small installations with a single administrator, the Management Infrastructure 402 could be installed on the administrator's workstation along with the Manager 401.

For single server installations, the Management Infrastructure 402 could be installed along with the Agent 304 directly on the server being protected. The Manager 401 could also be installed on the server as well as on the administrator's workstation.

For single system installations, either server or workstation, the Management Infrastructure 402 can be omitted entirely. The Manager 401 and Agent 304 would reside on the single system and use local storage instead of a central Management Infrastructure 402.

A more streamlined deployment would include the Agent 304 only with locally-stored policy and configuration settings. This type of deployment does not include any management user interface. Changes to the policy and configuration settings are made manually, using standard file editing and copying tools.

The architecture is designed to support these scenarios and many others.

FIG. 4 also shows how external tools 404 can interact with the APPFIRE™ firewall 201 to extend the management capabilities. For example:

The APPFIRE™ firewall 201 may include sophisticated Reporting Tools 404. However, the Agents 304 can send their log data to the database 407 in the Management Infrastructure 402. An organization can also use third-party reporting tools, such as Crystal Reports, to query a central database and generate the desired reports.

Some large organizations use Microsoft Operations Manager (MOM) 405 to monitor their networks. Such an organization can deploy a MOM application pack for the APPFIRE™ firewall 201 to monitor the APPFIRE™ Agent 304 logs, and have the results displayed on the MOM console with rest of their network management information.

4.1 APPFIRE™ Agent

The APPFIRE™ Agent 304 lives on every protected system and enforces the behavior controls defined by the administrator. The Agent 304 includes two main components: the generic behavior control engine 302 and the communications module (not shown in FIG. 3, see element 408 in FIG. 4).

The behavior control engine 302 monitors the access to and use of critical system resources. It provides a wide variety of controls over these resources, including resource names, access modes requested and time or frequency of access. These controls are flexible enough to describe the acceptable behavior of any application with respect to critical system resources. The behavior control engine 302 watches as applications request and use resources, looking for requests or uses that depart from the acceptable behavior. When the behavior control engine 302 sees such a departure, it takes an appropriate action.

The definitions of acceptable behavior are contained in the System Behavior Policy. The behavior control engine 302 simply provides the set of behavior controls available to the APPFIRE™ firewall 201. A policy must be loaded into the behavior control engine 302 to set the controls and begin enforcing correct behavior.

The behavior control engine 302 is loaded into an operating system environment kernel 301 (which includes the Windows kernel 303) to make it non-bypassable. It captures any attempt by any application to access or use any resource and determines whether the request is acceptable behavior for the application. The policy that protects other critical system resources also protects the behavior control engine 302 to ensure it remains intact and running. Malicious software cannot disable or evade it.

The behavior control engine 302 simply enforces behavior. The communication module 408 connects the behavior control engine 302 with the outside world—specifically with the management software. This module 408 is the liaison between the behavior control engine 302 and any systems on the network attempting to manage the Agent 304.

The behavior control engine 302 can be implemented as an addition to an existing operating system, e.g., as a set of loadable drivers and libraries. This implementation allows the behavior control engine 302 to work without access to operating system source code and without significant lag time behind new versions of an operating system.

The behavior control engine 302 can also be implemented as an integral part of an operating system. This implementation, with access to operating system source code and otherwise undocumented information, allows a wider set of features for recognizing and controlling application behavior.

The communications module 408 listens on the network for management commands from the Management Infrastructure 402. Before acting on a command, the module 408 authenticates the sender to ensure the commands are coming from a legitimate Management Infrastructure 402. Once authentication succeeds, the module accepts commands and responds appropriately.

In addition to receiving commands from the Management Infrastructure 402, the communications module 408 also periodically queries the Management Infrastructure 402 to see if new configuration data is available.

When new configuration data is available, whether it was sent by the Management Infrastructure 402 or discovered by querying, the communication module 408 retrieves it from the Management Infrastructure 402, saves it to disk and passes it to the behavior control engine 302. The communication module 408 also monitors the local log files, transfers log data to the Management Infrastructure 402 and requests alerts when unusual events occur.

Management commands typically provide configuration data for the Agent's use or request data from the Agent 304. If the command provides new configuration data, the communication module 408 saves the data to disk and passes it to the behavior control engine 302. If the command requests data, the communication module 408 retrieves the configuration or log data and returns it. It can retrieve data from disk or from the engine 302.

Since the Process Binding Rules 306 are context-sensitive, especially with respect to an application's ancestry, applying a new policy to a running Agent 304 needs to have access to historical process data. The Agent 304 uses this historical data when assigning processes to process sets in the new policy to make sure each existing process' ancestry is taken into account properly. This historical data can be maintained in the behavior control engine 302 itself or it can be exported to the communications module. In the former case, when a new policy is applied, the communications module simply gives it to the behavior control engine 302 and the engine 302 uses its internal historical data to assign processes to the correct process sets in the new policy. In the latter case, the communications module applies the historical data against the new policy and creates a set of process to process set assignments for the new policy. Then the communications module passes the process set assignments and the new policy into the behavior control engine 302. The engine 302 sets the process sets of all the existing processes and then begins enforcing the new policy.

The communication module 408 also includes plug-ins that can talk to third-party management systems, such as BMC's Patrol, Tivoli Policy Manager, CA Unicenter, Check Point Firewall-1 Management Console. If the Agent 304 is being managed from one of these systems rather than from the native APPFIRE™ Manager 401, a plug-in translates the foreign remote management commands.

4.2 Management Infrastructure

The Management Infrastructure 402 is the central storage point for all APPFIRE™ data. It includes:

all system behavior policies, both pre-defined policies and custom policies created by the user, Agent configuration data and Agent groupings, and log and alert data from the Agents 304.

As shown in FIG. 4, the Management Infrastructure 402 includes:

The J2EE Application Server 406: the J2EE Application Server 406 provides a platform for building the APPFIRE™ management features. Its clustering capabilities allow an organization to expand the Management Infrastructure 402 as necessary to provide additional capacity or redundancy.

The Relational Database 407: The Database 407 is the actual data repository for the APPFIRE™ data. The Management Infrastructure 402 is database-independent. A simple database can be provided with the J2EE Application Server 406. Organizations that require more capacity or redundancy can provide a database 407 that meets their needs. The J2EE Application Server 406 can be configured to use an existing database or a database newly installed just to support the APPFIRE™ firewall 201.

Enterprise Java Beans (EJBs): the EJBs implement the APPFIRE™-specific management logic. They provide interfaces to the Agents 304 and the APPFIRE™ Manager 401 and all access to the data goes through the EJBs.

An alternative Management Infrastructure 402 implementation would use a Microsoft .NET server in place of the J2EE Application Server 406 and use Microsoft .NET network applications in place of the EJBs. The Management Infrastructure 402 could also be replaced by the infrastructure of an existing enterprise management product. The specific technology used to implement the Management Infrastructure 402 is not critical, as long as it provides the ability to query and save the AppFire data in a central site.

The Management Infrastructure 402 is the intermediary between the Agents 304 and the APPFIRE™ Manager 401. Rather than communicate directly with each other, the APPFIRE™ Manager 401 and the Agents 304 exchange data through the Management Infrastructure 402.

The APPFIRE™ Manager 401 is the user interface to the APPFIRE™ firewall 201. It retrieves data from the Management Infrastructure 402 and displays it to the administrator. The administrator modifies the data by editing policies or reconfiguring Agents 304. When the administrator saves the modifications, the APPFIRE™ Manager 401 sends the data to the Management Infrastructure 402. If the data includes changes to Agent configurations, the Management Infrastructure 402 notifies the appropriate Agents 304 that changes have occurred.

Each Agent 304 holds a copy of its policy and other configuration settings locally. This allows the Agent 304 to operate without constant contact with the Management Infrastructure 402. As noted above, the Management Infrastructure 402 notifies each Agent 304 when its configuration changes. At this point, the Agent 304 retrieves its new policy or other configuration data from the infrastructure and puts it in effect. Since notifications can be lost, e.g., when the Agent 304 is off the network for an extended period of time, the Agents 304 also periodically query the Management Infrastructure 402 for changes. This ensures that changes are propagated in a timely fashion.

In addition to retrieving configuration data, Agents 304 also send log and alert data to the Management Infrastructure 402. This allows an organization to collect data from many Agents 304 into a central repository for system-wide reporting and analysis. Agents 304 use the Management Infrastructure 402 to generate alert messages, e.g., email and pages, rather than do it themselves. Normal log data is simply transferred to the Management Infrastructure 402 for storage.

4.3 APPFIRE™ Manager

The APPFIRE™ Manager 401 includes two user interface applications. The Enterprise Manager is used to manage and monitor APPFIRE™ Agents 304. It is the user interface that allows the administrator to configure Agents 304 and view the status of the network. The Authoring Environment is used to create and modify policies and policy components. In the descriptions below, the term APPFIRE™ Manager 401 is used to include both user interface applications. The applications are specifically mentioned when appropriate.

The APPFIRE™ Manager 401 contains two user interfaces because they perform two very different tasks. The Authoring Environment is used by policy authors who have significant knowledge about operating system resources and behavior, application behavior and APPFIRE™ policy concepts. Creating or modifying policy is an infrequent operation. The Enterprise Manager is used by system administrators or operators who may have little knowledge about operating system resources and behavior, application behavior and APPFIRE™ policy concepts. In contrast, their job is the day-to-day management of systems protected by APPFIRE™ Agents 304. They use the Enterprise Manager to configure and assign appropriate policies to Agents 304 and to view messages generated by the Agents 304 and stored in the Management Infrastructure 402.

Given the two very different type of tasks and users, it is likely that operators would only install the Enterprise Manager and that policy authors would only install the Authoring Environment. By only installing the user interface appropriate for their duties, an organization can have some assurance that neither group can modify data outside of their responsibilities.

4.4 The APPFIRE™ Enterprise Manager

The Enterprise Manager is designed to manage large-scale networks and supports thousands of protected systems. An administrator with very little security experience can configure and deploy policies to individual Agents 304 or to large groups of Agents 304 in a single operation. The Enterprise Manager provides the ability to see the status of an individual Agent 304 or an aggregated view of a group of Agents 304.

Since the Enterprise Manager may be dealing with thousands of Agents 304, it only requests or updates data about them when necessary. Communications that involve large numbers of Agents 304 are performed infrequently and kept very lightweight to avoid clogging the network. Requests for large amounts of data are made only when necessary. The Enterprise Manager caches information when it can to avoid extra communication.

All management communications are secure. The APPFIRE™ Manager 401 authenticates itself to the Management Infrastrucure 402 so it can be certain the APPFIRE™ Manager 401 is legitimate. The management commands and data are encrypted and signed for integrity. All communications protocols are based on TCP/IP standards.

The APPFIRE™ Manager 401 look-and-feel is completely configurable. The APPFIRE™ Manager's 401 appearance can be customized to provide a seamless integration with other products or tools they provide. This is especially useful for OEMs and VARs, but could be used for other purposes as well.

By using Java and standard TCP/IP communication protocols, the APPFIRE™ Manager 401 is easily transportable to a variety of operating system platforms.

Figure 6:
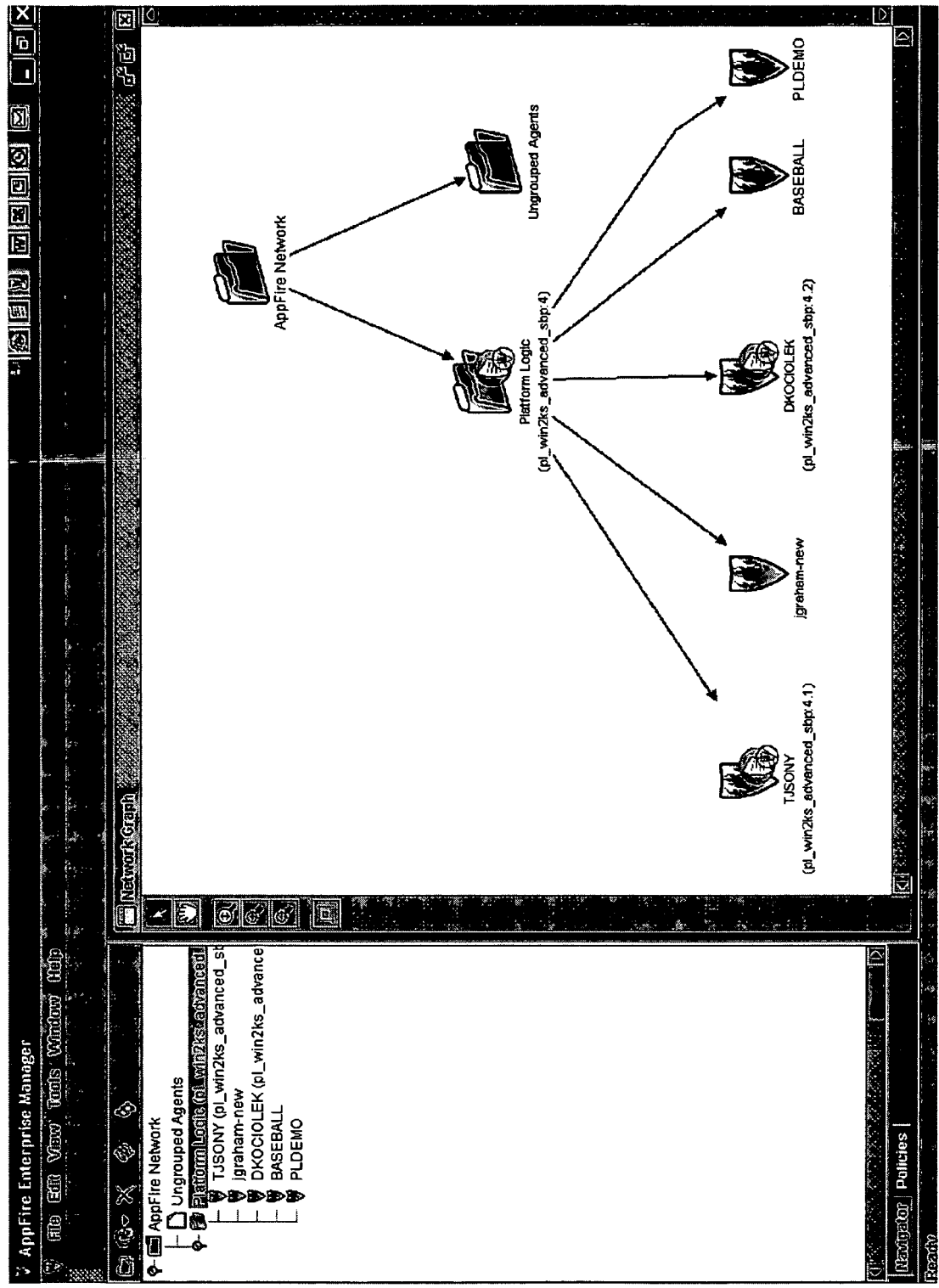
FIG. 6 shows a graphical view of some deployed APPFIRE™ Agents in the APPFIRE™ Enterprise Manager.

The screen shot in FIG. 6 shows an example of how the Enterprise Manager displays Agents 304, Agent groupings and policy assignment.

4.5 The APPFIRE™ Authoring Environment

The Authoring Environment presents a user-friendly policy editor (see FIGS. 7A-8B) that allows administrators to customize system behavior policies and policy components (BCDs 305, PBRs 306, macros, etc) to their particular corporate environment. They can also use the editor to create new policies and components for custom applications. These policies can be saved in a library in the Management Infrastructure 402 for future use.

Figure 5:
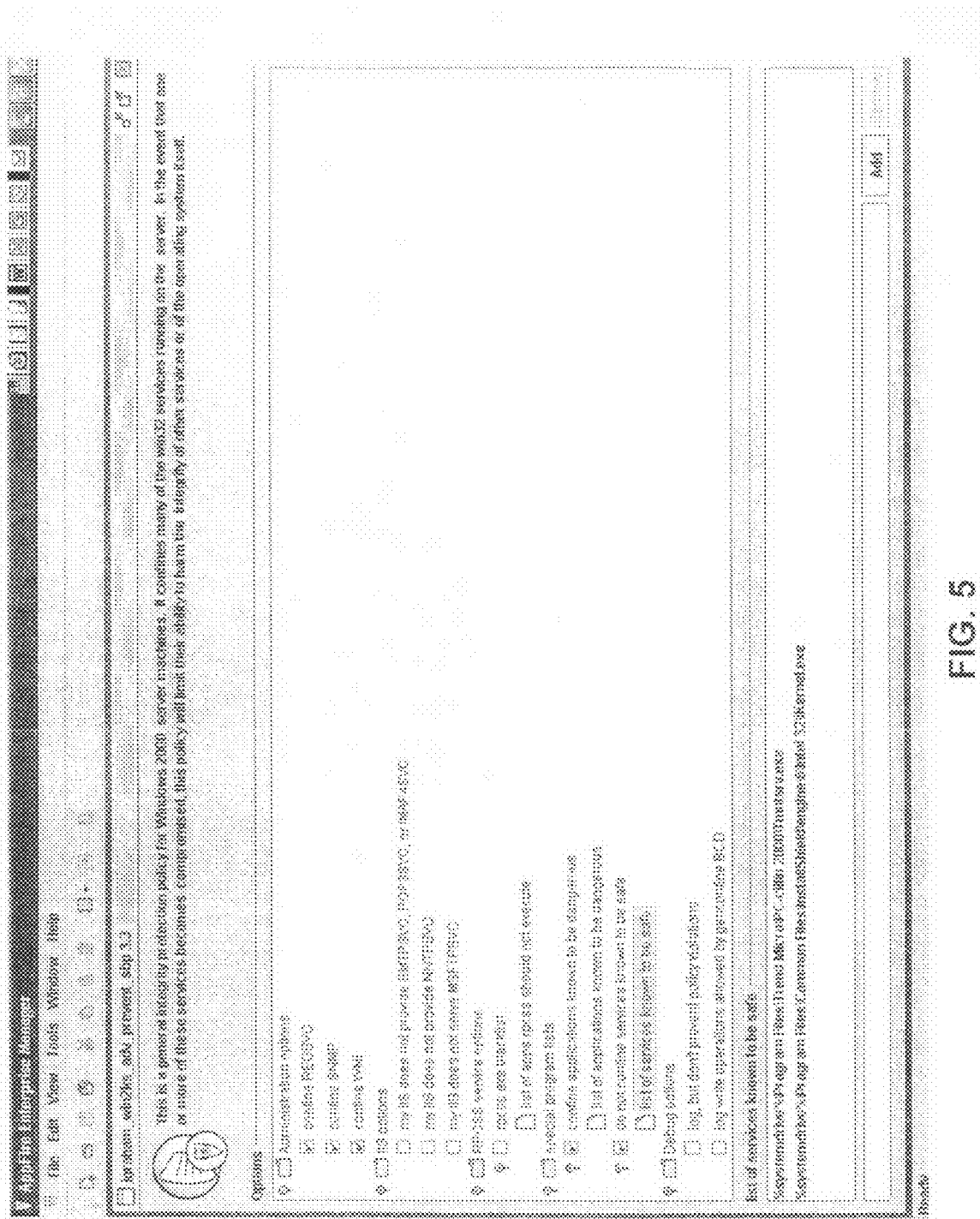
FIG. 5 shows a simple view of a policy in the APPFIRE™ Authoring Environment.

The APPFIRE™ firewall 201's modular policy model enables three different user experiences for the policy author:

1. A simple high-level view (FIG. 5) that requires very little configuration to implement—a few options to enable or disable based on the organization's need for specific application features. If a feature is not needed, the application does not need access to the corresponding resources. This view is for a novice administrator or organization that does not need to create or modify policy and BCDs.

2. A graphical view (FIGS. 7A-8B) showing process sets, BCDs and their relationship to one another. This view gives the ability to drill down into to a process set or BCD to make changes and more importantly see the effect of changes on overall system wide protection. The graphical view is for the administrator who wants to create new policies or make changes to previously provided BCDs.

Figure 9:
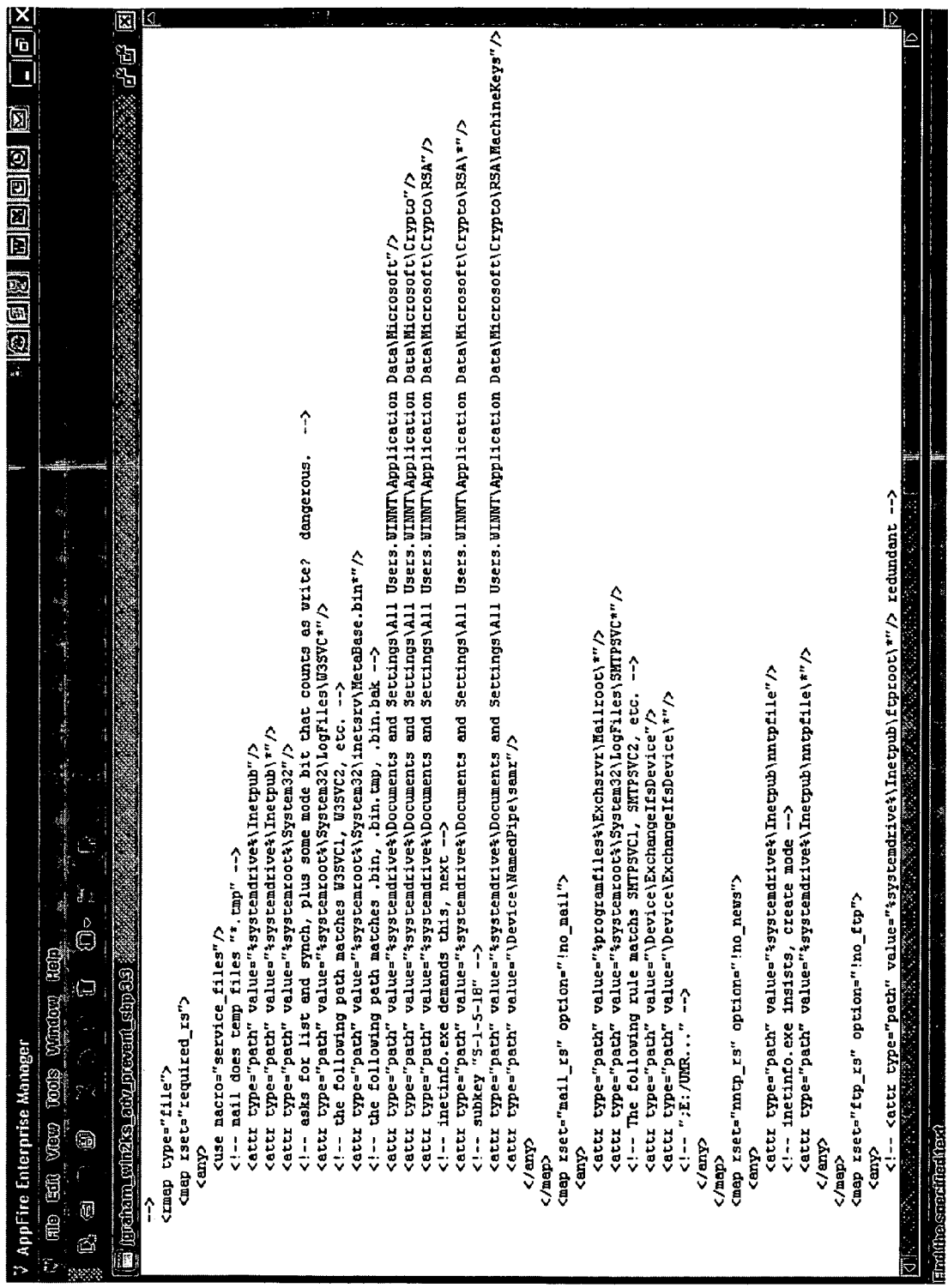
FIG. 9 shows a source view of a policy in the APPFIRE™ Authoring environment.

3. A source-level view (FIG. 9) showing the source code policy specification for the super technical administrator.

The Simple View (FIG. 5) offers a limited-choice interface in which administrators answer simple questions in order to secure their systems. The questions are presented in terms of application features and required capabilities of the system, e.g., "Does your server support FTP?" This view does not force the administrator to understand the complexities of our policy designs.

A simple view is not required in a policy. The policy author decides whether to create a simple view and uses the tools in the graphical view to create it. The simple view is displayed to administrators when they configure the policy using the Enterprise Manager. This capability allows policy authors to create the user interface for administrators using the policy. Rather than having the policy configuration user interface determined by the vendor, each policy includes the definition of its configuration user interface. The Enterprise Manager reads the simple view data from the policy and constructs the configuration user interface accordingly.

The Graphical View (FIGS. 7A-8B) offers a visual interface to configure every portion of the security policy. This requires the administrator to understand more about how the APPFIRE™ firewall 201 works, but in return offers them greater flexibility in securing their systems.

Figure 10:
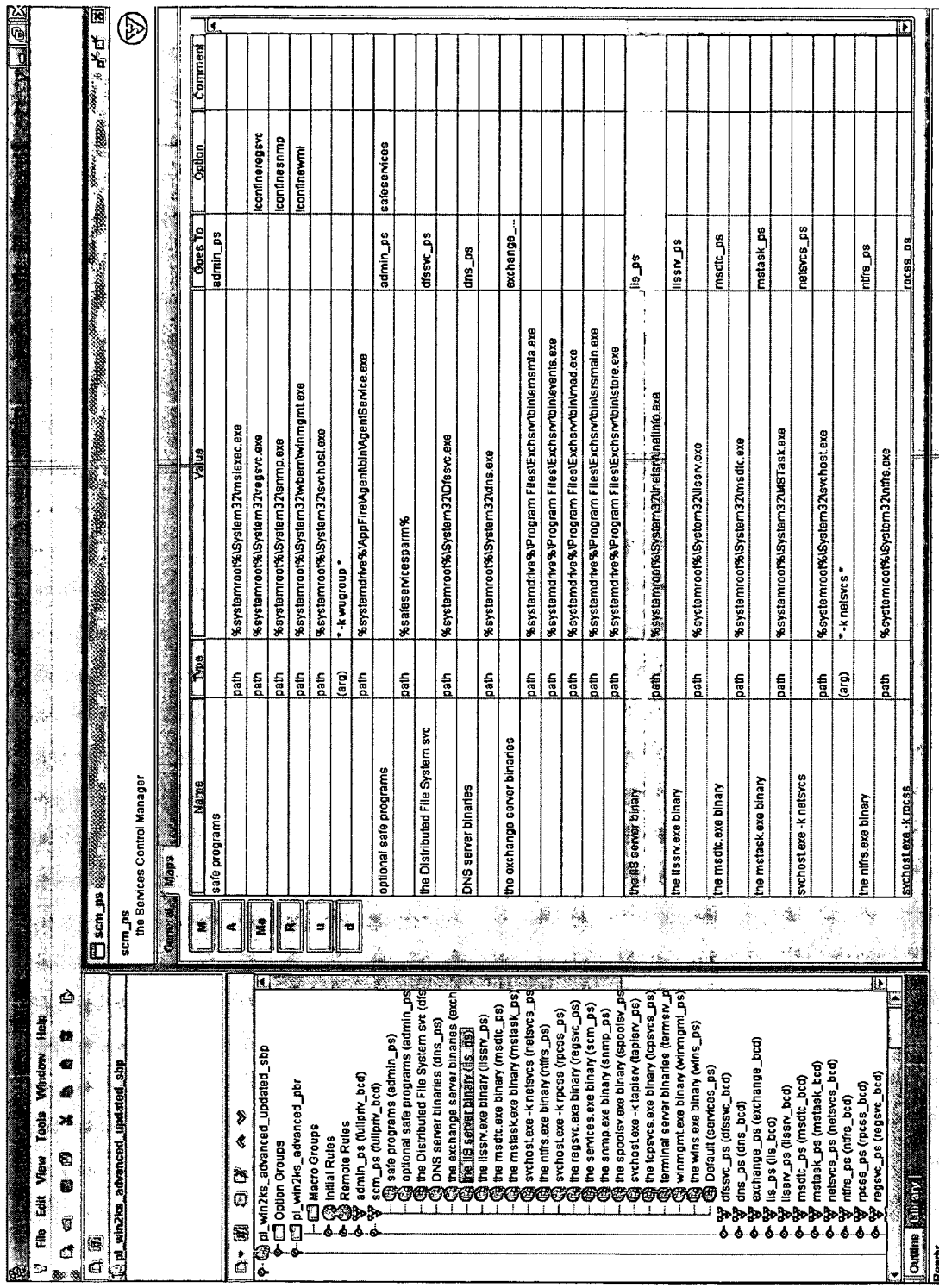
FIG. 10 shows a screenshot of the Process Set Editor in the APPFIRE™ Authoring Environment.

This view begins by displaying visual objects that represent BCDs 305 and Process Sets. Connections between the BCDs 305 and Process Sets show their relationships. To associate a BCD 305 with a Process Set, the author can visually draw the connection. Alternatively, the author can open the Process Set editor (FIG. 10) to associate the BCD.

Figure 7A:
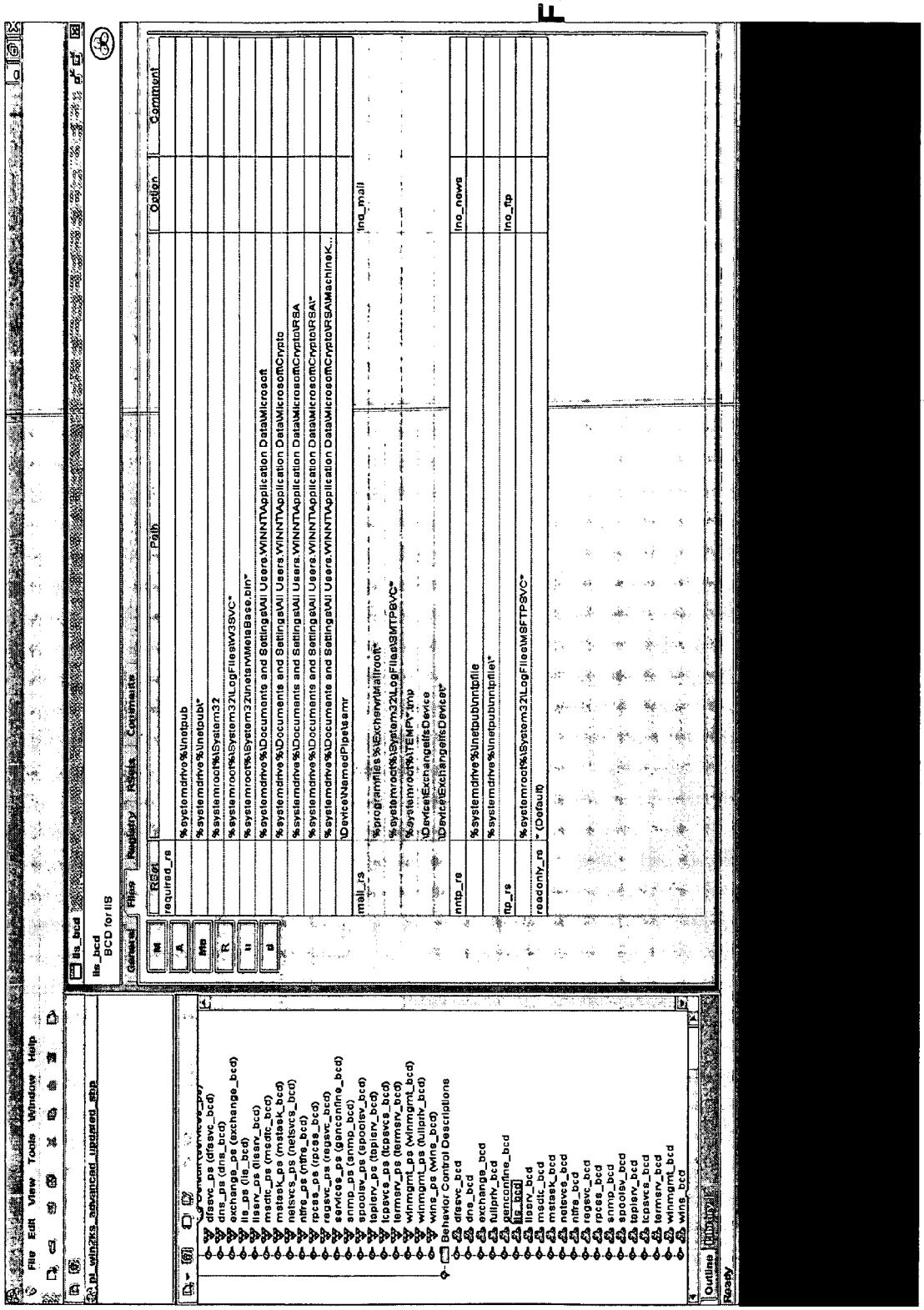
FIGS. 7A-7B show screenshots of the BCD editor in the APPFIRE™ Authoring Environment.
Figure 7B:
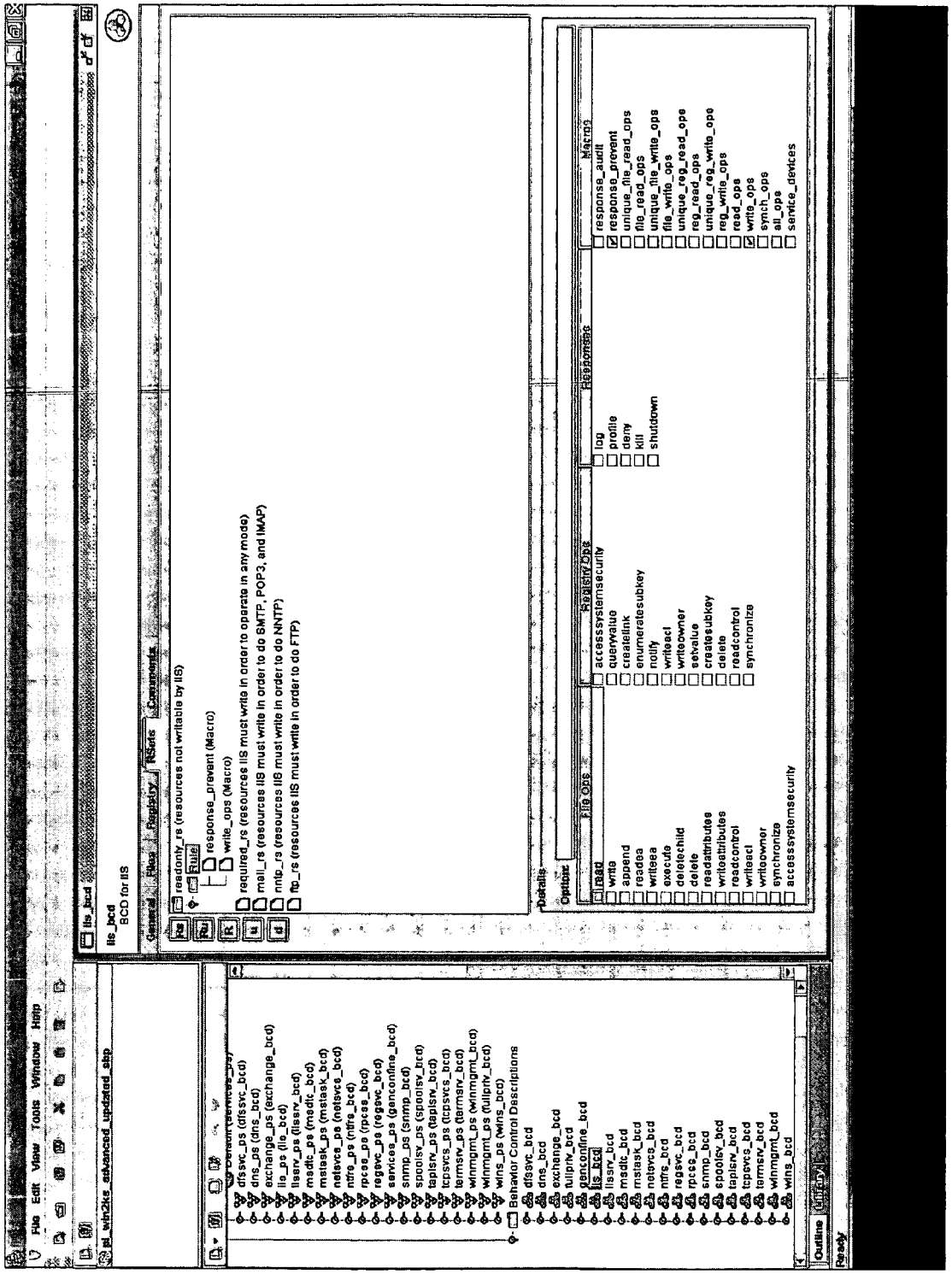
Figure 8A:
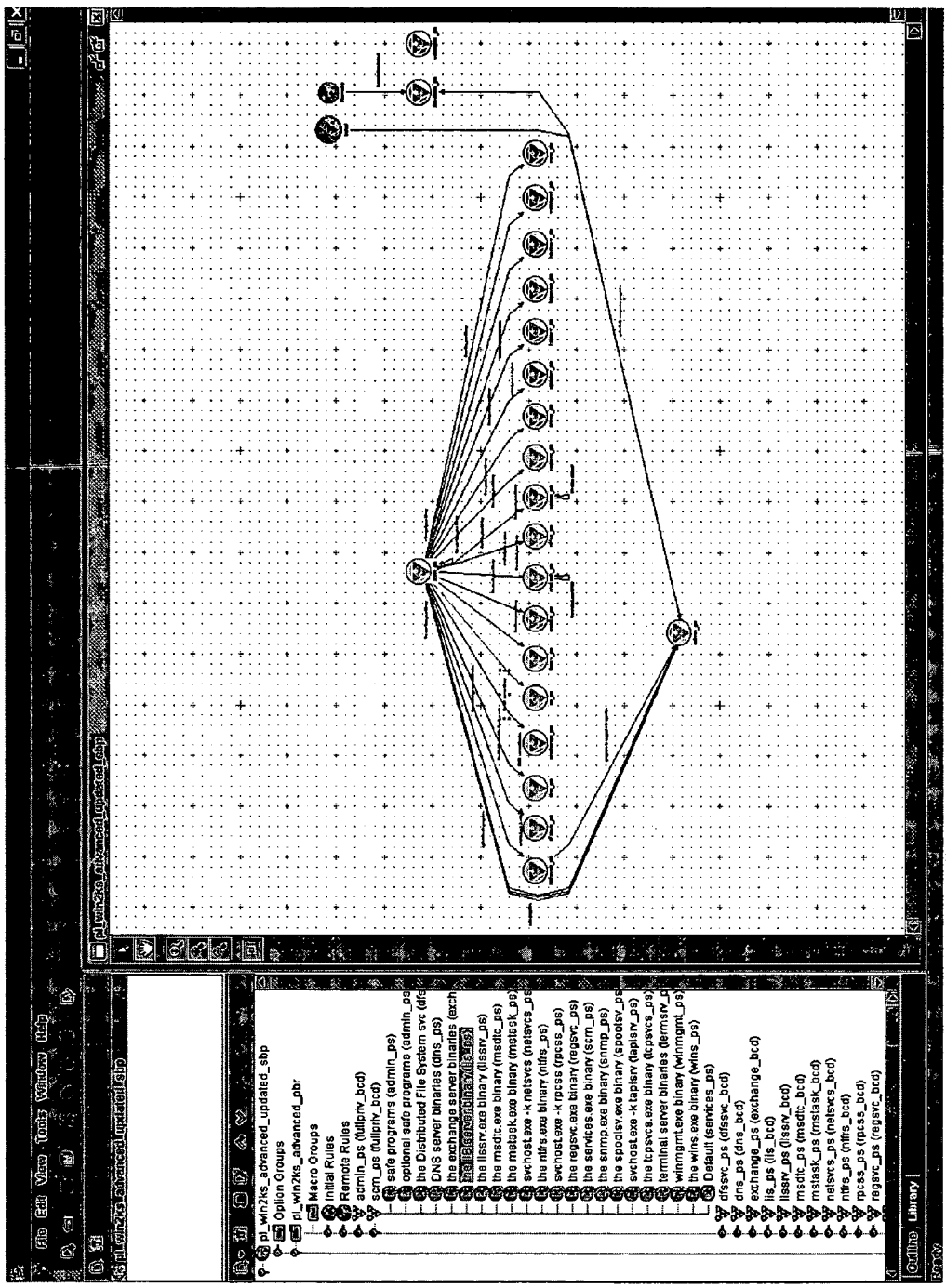
FIGS. 8A-8B show a graphical view of Process Set relationships in the APPFIRE™ Authoring Environment.
Figure 8B:
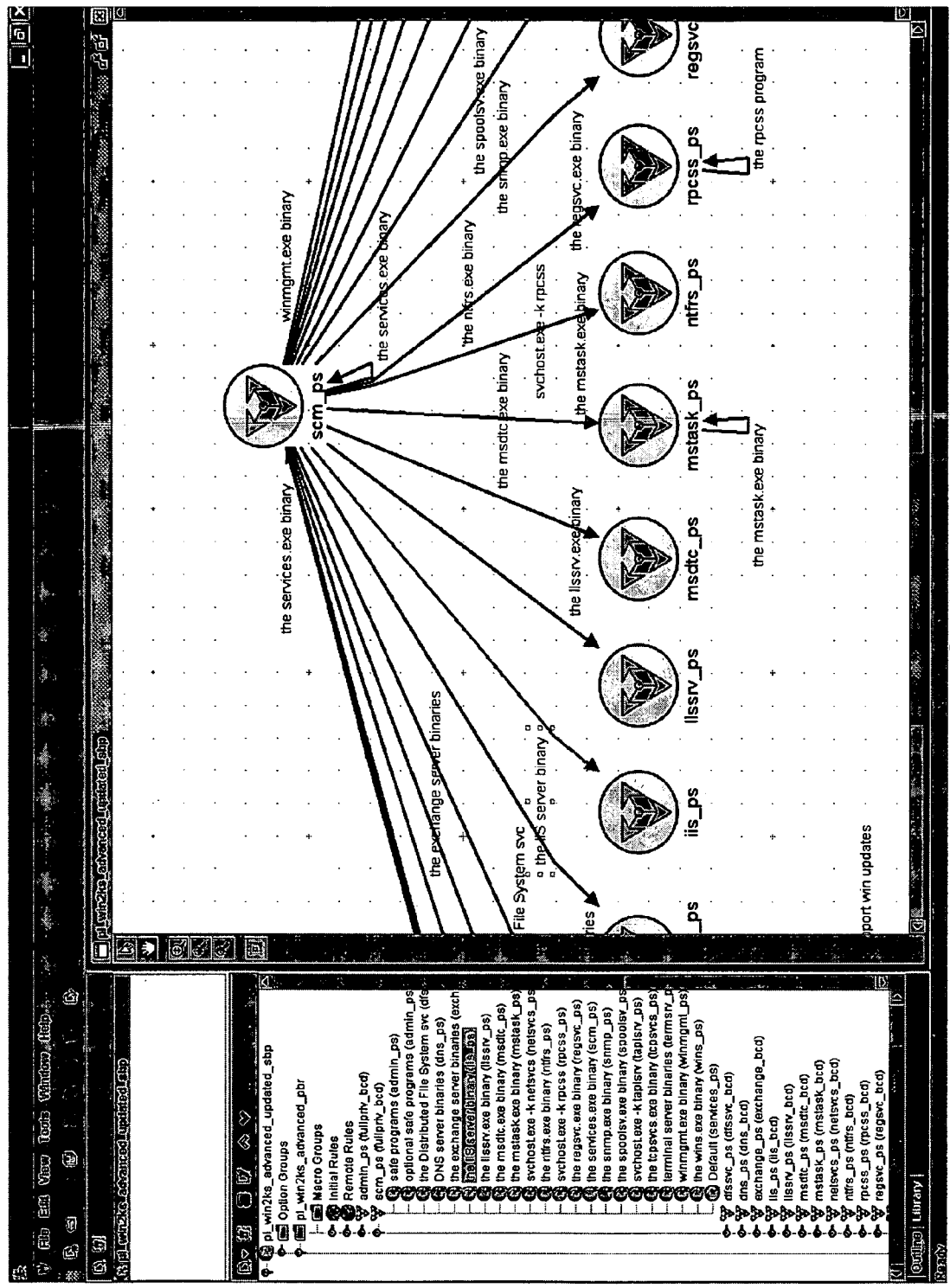

If the author wants to configure the sub-elements of these components they can expand the icons representing them. This expansion will then show the sub-elements and the relationships between them. Alternatively, the author can open a BCD editor and define the sub-elements as a list of rules. The screen shots in FIGS. 7A-7B show the contents of a BCD as viewed in the BCD editor.

The Source View (FIG. 9) shows the actual source code for the policy being created. This view not only requires understanding how policies work and how to construct them, but also how to use the source code to specify policy. The Source View would normally only be used by the most advanced policy writers.

Figure 11:
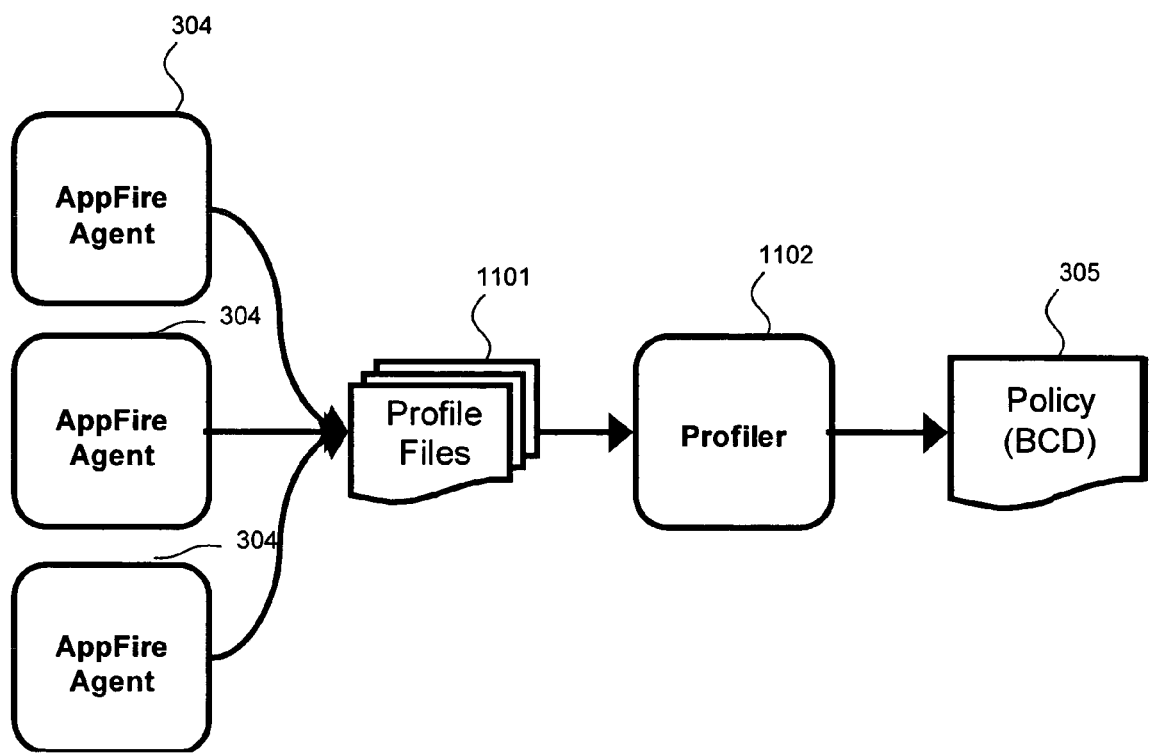
FIG. 11 shows a relationship between the agents and the profiler tool.

FIG. 11 illustrates the process of using automated tools to creating a BCD 305. As shown in FIG. 11, for each APPFIRE™ Agent 304, a plurality of profile files may exist. A plurality of profile files 1101 may exist. These profile files 1101 are used by the profiler 1102, as discussed below, to create a BCD 305.

5.0 System Behavior Policies

The policies are the key component of the APPFIRE™ firewall 201 deployment. The Agent 304 provides a behavior control engine 302 but that behavior control engine 302 needs instructions. Those instructions are in the policy. The APPFIRE™ Manager 401 provides a way to organize and configure Agents 304 but it needs policies to configure them.

A system behavior policy defines a set of applications, i.e., programs, threads, or processes, and the acceptable and unacceptable behaviors for those applications. It also defines the actions to take when unacceptable behavior occurs. The APPFIRE™ firewall 201 policies allow a modular approach to policy development and management. Policies contain three components: Behavior Control Descriptions (BCDs) 305, Process Sets (Psets), and Process Binding Rules 306 (PBRs).

The APPFIRE™ firewall 201 provides a library of predefined policies and policy components (BCDs 305, PBRs 306, macros, etc). These include generic policies for each supported operating system, e.g., Windows 2000 Server, generic BCDs that protect critical system resources, as well as more specific BCDs for specific operating system services and popular applications. Initially, the library can include only the most popular applications. Over time, the library can increase. The APPFIRE™ Manager 401 can import objects into the library at any time—a new product release is not required.

The APPFIRE™ firewall 201 policies are specified in an XML-based policy creation and management language, as discussed above, that enables the modular policy development process that is critical to creating policies for complex systems. The source code for an example policy that profiles all resource access attempts is shown below:

```
<?xml version="1.0"?>
<policy name="profile policy" version="1" info="Profile Everything">
    <bcd name="ProfileBCD" version="1" info="Profile Everything">
        <access>
            <rset name="all_t" info="all resources"/>
            <rmap type="file">
                <default rset="all_t"/>
            </rmap>
            <rmap type="registry">
                <default rset="all_t"/>
            </rmap>
            <rule rset="all_t">
                <response type="profile"/>
            <op type="file" perm="read"/>
            <op type="file" perm="readea"/>
            <op type="file" perm="execute"/>
            <op type="file" perm="readattributes"/>
            <op type="file" perm="readcontrol"/>
            <op type="file" perm="synchronize"/>
            <op type="file" perm="write"/>
            <op type="file" perm="append"/>
            <op type="file" perm="writeea"/>
            <op type="file" perm="deletechild"/>
            <op type="file" perm="writeattributes"/>
            <op type="file" perm="delete"/>
            <op type="file" perm="writeacl"/>
            <op type="file" perm="writeowner"/>
            <op type="file" perm="accesssystemsecurity"/>
            <op type="registrykey" perm="queryvalue"/>
            <op type="registrykey" perm="enumeratesubkey"/>
            <op type="registrykey" perm="notify"/>
            <op type="registrykey" perm="readcontrol"/>
            <op type="registrykey" perm="synchronize">
            <op type="registrykey" perm="setvalue"/>
            <op type="registrykey" perm="createsubkey"/>
            <op type="registrykey" perm="createlink"/>
            <op type="registrykey" perm="delete"/>
            <op type="registrykey" perm="writeacl"/>
            <op type="registrykey" perm="writeowner"/>
            <op type="registrykey" perm="accesssystemsecurity"/>
            </rule>
        </access>
    </bcd>
    <pbr name="therules" version="1" info="Put everyone in a single pset">
        <pset name="profile_p" info=""/>
        <psetdef name="profile_p" bcd="ProfileBCD" log="off" profile="on">
            <newproc>
                <default pset="profile_p"/>
            </newproc>
        </psetdef>
        <initial>
            <default pset="profile_p"/>
        </initial>
        <lanman>
            <default pset="profile_p"/>
        </lanman>
    </pbr>
</policy>
```

The main purpose of the APPFIRE™ firewall 201 and the policies it enforces is to restrict some or all of the applications running on a system to a limited set of behavior defined as their "normal" behavior. But the APPFIRE™ firewall 201 also has to handle the unusual behaviors required to administer a system it protects. Many administrative actions result in dangerous actions that the policy would define as "abnormal" and thus prevent. In some cases, behavior resulting from legitimate administrative changes is indistinguishable from malicious attacks. Therefore, most of the time, the customer will want the policy to prevent such behavior. However, if it is a result of legitimate administration, it should be allowed. So, the system includes a privilege-bracketing mechanism for an administrator to indicate when they are going to perform administrative actions and thus these normally "abnormal" behaviors should be allowed. The mechanism can be implemented in a number of ways, including:

Identity-based: The policy can define a specific, privileged identity. The administrator logs into the system using the privileged identity when they want to do administration and logs in using a non-privileged identity when performing normal tasks.

Gateway program: The system can include a special program that the administrator runs to indicate they want to perform administrative tasks. The gateway program can authenticate the administrator to any desired degree, e.g., username and password, cryptographic authentication, biometrics, etc. Once the administrator is authenticated, the gateway program can start privileged programs or notify the behavior control engine to enter an administrative state and thus allow actions that would normally be denied.

5.1 Modular Policy Definition

Defining the behaviors for all processes on a system without preventing legitimate application usage is a complex problem to solve. Dedicated servers must support some applications for system and application administration. It is not unusual for organizations to put several server applications on a single machine. A successful product must make the task of policy definition for such complex systems easier, and ensure that the policy will not prevent normal application usage.

The core of The APPFIRE™ firewall 210's sophistication is a policy creation and management language that enables a modular approach to policy development and management. The policies include three components:

Behavior Control Descriptions (BCDs) 305 are self-contained definitions of behavior for an application or group of applications. BCDs 305 are completely independent, so changes to one BCD 305 cannot affect any other part of the policy.

Process Sets (Psets) are logical groupings of processes within a given host (e.g., Interactive Pset, Administrator Pset, IIS Pset, and Exchange Pset). A Pset is associated with a specific BCD 305. Since a Pset is always associated with only one BCD 305, all processes in the Pset are controlled by the same BCD 305.

Process Binding Rules 306 (PBRs) assign processes to process sets.

The PBRs 306 create a graph of Process Sets. Changes to PBRs 306 only affect process sets reachable from the point of change in the graph.

Modular policy development allows easy modifications. A user can be absolutely sure of the limits to the ramifications of one's changes. A user can concentrate on those areas and make sure the changes are safe. New policy development also becomes easier because the system can be divided and concentrated on a piece at a time. The pieces combine in well-defined ways so one doesn't need to know all the detail of everything when combining them.

Some types of global control may require duplicating rules in several BCDs 305 or Process Sets. The macro capability in the policy language minimizes the actual duplication required.

An alternative method for sharing definitions between BCDs 305 or Process Sets is to define the policy in an object-oriented fashion. This allows common items to be defined in base classes and individual BCDs 305 or Process Sets to extend these base classes with rules unique to the application to which the BCD or Process Set is targeted.

Within the modular units, i.e., the BCDs 305 and PBRs 306, the Rules are order-dependent and the user determines the order. The APPFIRE™ Editor may suggest a default ordering that will work in most cases, but the user is free to adjust that ordering if necessary to achieve their goals. Those users who use the Simple View (see FIG. 5) in the user interface (UI) will never see any Rule lists or need to worry about ordering at all.

The modular structure allows a developer to break a complex policy development task into smaller manageable tasks. The smaller tasks are largely independent and have well-defined effects on each other. Similarly, the modularity simplifies modifying existing policies by limiting the amount of knowledge a developer needs about the policy and by clearly defining the ramifications a particular modification might have. Policy components are context-sensitive allowing the same application executed under different circumstances to be controlled differently. The ability to use context information allows creation of more sophisticated system policies thus providing even greater security with more flexibility.

The APPFIRE™ firewall 210's modular, context-sensitive, graphical view of policy creation and management means that:

New application Psets and BCDs can be added easily to policies without impacting existing policy components.

Atomic and global changes can be made to a policy with a clear understanding of the impact of those modifications on system protection.

More secure and finer grain policies can be created.

A protection model can grow with the needs of a diverse and large enterprise without becoming unmanageable.

New Psets and BCDs can be developed concurrently or sequentially by independent groups and combined into policies with a clear understanding of how the resulting policies will provide protection.

A policy can include definitions of well-known attachment points for adding Psets and BCDs developed in the future. The policy author defines these attachment points such that new Psets and BCDs attached to the policy will function correctly. A developer who wants to add a Pset and/or BCD to an existing policy references the attachment point suitable for the new components. For example, if the Pset and BCD are designed to control a custom service, the author could reference the "Service" attachment point. If the Pset and BCD are designed to control an application that can be started in many ways, the author could reference the "System-wide" or "Global" attachment point. In this way, the author of the original policy (who defined the attachment points), the author of the new Pset and BCD (who uses an attachment point), and most importantly, the customer know that the resulting policy will work correctly and provide the desired protection. If a customer attempts to attach a Pset or BCD to an attachment point that does not exist in the policy, the attachment will fail.

The modular policy architecture allows application vendors to build Psets and BCDs for their applications and distribute them along with the applications. The Pset and BCD can protect the vendor's application from harming other parts of the system and keep other applications on the system from harming it. This provides greater assurance to the customer that the application is safe and makes the vendor's application more attractive.

5.2 Process Sets

In order to control applications, the APPFIRE™ firewall 201 provides ways to group applications ("decompose the system"), or more accurately, to group processes running applications. These groupings form the basis for subsequent behavior controls enforced by the system.

Groups of processes are called Process Sets. Process Binding Rules 306 map processes to Process Sets (see screen shot of Process Set editor in FIG. 10). Process Binding Rules 306 are context-sensitive to parentage, so that the same application launched by two different methods might be placed in two different Process Sets. The APPFIRE™ Authoring Environment provides a graphical representation of the Process Binding Rules 306 (see FIGS. 8A-8B) to assist the author in understanding the relationships between process sets. Each process belongs to a single Process Set at any point in time. Each Process Set maps to a specific BCD 305. Thus, the behavior controls applied to a process are completely defined by its Process Set. Process Sets are defined using attributes of a process, including:

pathname of the file being executed
    process identity (including both user and group identities)
    process privileges
    process command line arguments
    additional attributes of the file being executed, including:
        file owner
        file system type
        encryption present
        object type (file versus link)
        remote or local
    Any other process attributes available from the system
    Combinations of these attributes can also be used.

A Process Set maps each of its descendants to a Process Set. Often, descendants are mapped to the same process set as the parent. But a Process Set can be defined to include all, some, or none of its descendants. An extreme case would have each descendant placed in its own Process Set.

Process Binding Rules 306 can include dynamic criteria as well as the static process attributes listed above. Dynamic rules assign processes to Process Sets based on operations they perform, such as opening particular files or devices. Dynamic criteria can be combined with static criteria in a single Rule.

Predefined BCDs 305 and Process Binding Rules 306 may be supplied with the APPFIRE™ firewall 201 installation. These can be used as starting points for creating custom policies. All portions of the policy are modifiable by the user.

Most modern operating systems allow remote procedure calls, where a server application accepts requests from client applications and the server application performs actions on behalf of the client applications. In some systems, the server application impersonates some aspects of the client application's attributes when making calls on its behalf. In these situations, the Process Binding Rules 306 can define process sets in terms of the process attributes used on each behavior. So rather than treating all actions of a server process the same, each action can be controlled based on the process set or other attributes of the client application on whose behalf it is being taken.

If the behavior control engine can obtain client attributes along with the client request, such as the client's process set assignment, from the operating system in an assured manner, it can make decisions about server application actions based on those client attributes. If such attributes are not available or can't be trusted, then the server application has to be controlled in a more general way, based on its own attributes and behaviors.

Besides the general Process Set definition rules, the Process Binding Rules 306 include several pseudo-Process Sets to handle special behaviors:

Initial Rules: These rules define the Process Set assignments for any applications that are running before the behavior control engine starts. For these applications, there is no parentage history, and the initial rules must take this into account. If the behavior control engine is implemented as part of the operating system, there may be no opportunity for applications to start before the engine. But in the case where the engine is implemented as an addition to an existing operating system, it is likely that some low-level system applications or processes will start before the engine does.

Remote Rules: These rules define the Process Set assignments for any actions take by applications on remote systems against the local system. Depending on the implementation, the behavior control engine may or may not know the normal information about the application taking the action. If the operating system provides information such as the remote application name and identity or the Process Set assignment of the remote application, then the Remote Rules can specify Process Set assignments using those attributes. But in many cases, this information is not available for remote requests. Therefore the Remote Rules have additional capabilities to make Process Set assignments based on the identity of the remote system from which the request has come.

5.3 Behavior Control Descriptions (BCDs)

The BCD 305 controls a set of applications, i.e., programs and processes, and defines the acceptable and unacceptable behaviors for those applications. It also defines the actions to take when unacceptable behavior occurs:

Applications: some BCDs 305 are designed for only a single application, e.g., an Outlook BCD 305A or an IIS BCD 305C. Other BCDs are designed for a large number of applications, e.g., an "administrative tool" BCD.

Behaviors: some BCDs 305 include a small number of generic behaviors, e.g., "you cannot write to the D: drive." Other BCDs 305 might include a large number of more specific behaviors, e.g., "you can only write to the following list of Registry keys."

Actions: the response to an unacceptable behavior will be different depending on the behavior and on the environment. Some actions just record the behavior, e.g., logging or sending alerts. Other actions block the behavior, e.g., deny with an error.

The APPFIRE™ firewall 201 preferably provides a library of pre-defined BCDs 305. These include generic BCDs 305 for each supported operating system, e.g., Windows 2000 Server, as well as more specific BCDs 305 for popular applications.

A typical policy includes a number of BCDs 305, although it may include as few as one BCD. The specific BCDs 305 used are determined by the applications expected to run on that system and by the granularity of control required on the system. Even if there is no specific BCD 305 for an application, using a generic BCD 305 immediately strengthens the security of the operating system platform and any application running on it. A generic BCD 305 can also be used to protect the base operating system, since an application is only as secure as the base that supports it.

The APPFIRE™ firewall 201 protection is based on behavior definitions, not on signatures of specific files or network commands. A signature-based architecture results in a long list of very specific patterns to recognize and block. When a new attack is mounted, its signature must be determined and added to this list by the vendor. Then it must be deployed to all the protected systems. Until this happens, the attack is free to cause damage to as many systems as it can reach.

In contrast to signature approaches, the APPFIRE™ firewall 201 is based on the concept that each software program accesses certain system resources in certain ways to accomplish its tasks. There are some system resources it must create or modify, i.e., log files, message store, document files, etc. There are other system resources it only needs to read, i.e., configuration data, dynamic libraries, and content. And there are a large number of resources it has no reason to access at all. Many attacks cause damage by "convincing" an application to modify resources that are in the latter two categories.

The BCDs 305 define the acceptable behavior of an application with respect to system resources. By enforcing the BCDs 305, the APPFIRE™ firewall 201 can stop bad behavior without advance knowledge of an attack and before it causes damage to the system. This protection works no matter what method the attacker takes to gain access to the system; it stops automated viruses as well as malicious insider attacks. This behavior-based approach to protection allows the APPFIRE™ firewall 201 to protect against new attacks right away, without the "catch-up" problem of signature-based products.

Process Binding Rules 306 (PBRs, see discussion above) are defined with respect to a particular process set. All Rules in an APPFIRE™ firewall 201 policy are context-sensitive, in other words, they depend on the parentage of the application.

BCDs 305 are self-contained. They divide resources and control access independently of each other. Thus, by dividing the system and constructing the policy from modular components, the APPFIRE™ firewall 201 simplifies the task of creating and modifying system policies. Changes to a particular BCD 305 are guaranteed to affect only that BCD 305. Binding Rule changes for a particular process set have ramifications only for descendant Process Sets, not for the entire system. Thus, when making changes to or extending a policy, the user does not need to deal with the entire policy but, only needs detailed knowledge of the portion being changed. Even changes to the top level Process Sets can be done without affecting the BCDs 305.

By suggesting an ordering but allowing adjustments, the APPFIRE™ Editor (see FIGS. 7A-7B) provides the maximum assistance. For simpler policies, the developer can accept the default ordering. But for complex policies or for developers who think differently, the Editor gives the freedom to order and organize Rules in the most convenient way.

All BCD Rules allow one of the following actions:

Deny the operation (optionally specifying an error code to return)

Query an administrator about the operation

Kill the offending process

Shut down the system

Allow the operation

In addition, any BCD Rule can specify to log an event and/or generate profile information when the Rule is matched. All Rules have exactly the same actions. There are no special Rule types that have restricted choices or additional choices.

Since all BCD Rules use the same pattern and have similar choices, the learning curve for configuring policies is low. Once a user knows how to use the Rules, he knows how to use them everywhere. For any action he can control, he has the full range of options for how to control it. This means administrators can concentrate on configuring systems, not on figuring out how to configure them.

5.4 The APPFIRE™ Profiler

The APPFIRE™ Profiler 1102 is a set of tools that assist with policy creation. The tools record the behavior of an application, generate an initial BCD 305 or entire policy and allow iterative refinement of the policy. These same tools can be used by customers to generate BCDs 305 for their own custom applications.

An APPFIRE™ Profiler (see element 1102, FIG. 11) assists with BCD creation. The Profiler 1102 uses the recorded behavior of an application, generates an initial BCD 305 and allows iterative refinement of the BCD. An engineer can use these tools to create the pre-defined BCDs 305 distributed with the APPFIRE™ firewall 201. The Profiler 1102 can be used by users to generate BCDs 305 for their own custom applications.

The Profiler 1102 also has the ability to update an existing policy or BCD. In this case, the author gives the Profiler a recording of additional application behavior and an existing policy or BCD. The profiler merges the new behavior into the policy or BCD. This is useful when trying a policy or BCD out in a new environment with new behaviors. It is more efficient to augment the existing policy or BCD than to start from scratch.

The Profiler 1102 can also produce data files instead of policy files. These files are delimited text files suitable for importing into a spreadsheet, database or other analysis tool. A policy author can use this type of output to analyze application or system behavior before generating or modifying policies.

6.0 J2EE Application Server

The APPFIRE™ firewall 210's management framework is preferably built on a J2EE Application Server architecture. The J2EE Application Server 406 provides several key capabilities for the framework:

Application server clustering means that no single point of failure exists. The J2EE Application Server 406 keeps the clustered machines in sync, automatically distributes work among them, and allows the system to keep running if one machine goes down. In addition, when more capacity is needed, the enterprise can expand the cluster without extensive infrastructure redesign. The Enterprise Java Beans running on the application server isolate the Database 407 from the user interface. This separation makes the APPFIRE™ management framework database-independent. The enterprise can choose a database that best suits its operational and capacity requirements. It can leverage an existing database or acquire a new one.

Using Java and following the J2EE standards allows the Management Infrastructure 402 to run on any platform (NT, UNIX, LINUX, etc).

The Management Infrastructure 402 supports both redundancy and expansion through the use of a J2EE-compliant Application Server 406. The J2EE Application Server 406 includes a clustering capability and automatically distributes work and shares data among the systems.

The built-in clustering provided by the J2EE Application Server 406 is very powerful. It provides redundancy, allowing Agents 304 and administrators to reference the cluster, rather than an individual machine. If one of the systems in the cluster goes down, work is handled by the remaining systems. If the network grows and requires more resources for APPFIRE™ management, the administrator simply needs to add another system to the cluster. The Agents 304 and administrators take advantage of the additional capacity automatically as the cluster distributes work to the new system.

The Management Infrastructure 402 is database-neutral. The J2EE Application Server 406 preferably is supplied with a built-in database 407 suitable for small installations. Larger installations will need a higher capacity database, such as MS SQL or Oracle. The APPFIRE™ firewall 201 supports all of these.

Database neutrality gives users extremely flexible configuration options. Small organizations don't have to make a separate database purchase—they can use the built-in Database 407. If the organization grows beyond the capacity of the built-in Database 407, it can migrate to an external database when necessary. Larger enterprises that have already invested in large database resources can take advantage of them from the start. By supporting the most popular database products, users can use what they are familiar with, rather than needing to learn about a new database product just for the APPFIRE™ firewall 201.

7.0 System Resources Access Control

File access: The APPFIRE™ firewall 201 controls access to any attributes of files or directories, including:

pathname, including wildcards for single and multiple path elements file owner file version filesystem type encryption present object type (file versus link)

any other file or directory attributes maintained by the operating system

Any combination of these attributes can be used.

The APPFIRE™ firewall 201 also provides "short hand" symbols, and allows specification of any environment variable or registry value for system- or application-specific values. Each Rule is part of a BCD 305 and controls all processes in process sets mapped to the BCD 305.

The APPFIRE™ firewall 201 allows individual specification of every operation provided by the operating system. The operations are controlled independently. The UI also provides abstract operations to avoid confusion for novice users. The system ships with predefined BCDs 305, which in turn include file resource maps for common groupings.

Registry key control: The APPFIRE™ firewall 201 controls access to registry keys and values using any attributes of registry keys and values, including:

pathname, including wildcards for single and multiple path elements key/value owner object type (key versus link)

any other registry attributes maintained by the operating system

Any combination of these attributes can be used.

Each Rule is part of a BCD 305 and controls all processes in process sets mapped to the BCD 305. The APPFIRE™ firewall 201 allows individual specification of every operation provided by the operating system. The operations can be allowed or denied independently.

The UI also provides abstract operations to avoid confusion for novice users. The system ships with predefined BCDs 305, which in turn include registry resource maps for common groupings.

Network socket access: The APPFIRE™ firewall 201 controls access to network services (i.e., sockets). Sockets are specified by:

connection direction (server, client)

protocol & port (e.g., tcp/23) for initial connection and subsequent connections remote addresses for the connection local addresses for the connection The APPFIRE™ firewall 201 allows separate control of server and client use of a socket. The system ships with predefined BCDs 305, which, in turn, include network resource maps for common protocols.

COM component access: The APPFIRE™ firewall 201 controls access to COM components using either the literal PROGID (friendly name) or the CLSID (GUID). Each rule is part of a BCD 305 and controls all processes in process sets mapped to the BCD 305. Basic granularity of control allows access (or not). The system ships with predefined BCDs 305, which, in turn, include COM resource maps for common groupings.

Application control: application control is covered by the general file access control feature. Blocking execute access to the application executable(s) prevents that application from running. Applications can be specified by pathname and any of the other attributes available to file access control rules. The Simple View UI also provides a more intuitive way to block applications from running.

Network worm protection: worms do their damage by accessing resources. The APPFIRE™ firewall 201 features allow specification of behavior controls to contain or prevent the damage worms can cause. Protection against worms using standard APPFIRE™ firewall 201 behavior control provides full flexibility to choose which processes are subject to the controls. Protection against worms using standard APPFIRE™ firewall 201 behavior control provides full flexibility to Deny (with the full range of denial responses), Log or both.

8.0 Example—CodeRed Worm

To illustrate how the APPFIRE™ firewall 201 protects a system, let us examine the CodeRed worm. The CodeRed worm attacks Windows 2000 systems via a buffer overflow vulnerability in Microsoft IIS. When it successfully infects a web server, it has three main behaviors:

Some variants "deface" web pages with a "Hacked by Chinese" message. This defacement occurs entirely in memory. Web page files on disk are not altered.

Some variants create a Trojan Horse file in the root directories of the systems hard drives. When executed, this Trojan Horse modifies two registry keys to make certain system directories remotely accessible and copies the Windows cmd.exe program to these directories. If successful, these actions create a backdoor, allowing the attacker to access the system remotely at any time in the future.

All variants initiate HTTP connections to other Web servers, searching for new machines to infect.

Under normal conditions, a Web server has no reason to modify system registry keys or to create files in system directories. Rather, it should only read system registry keys and directories. An APPFIRE™ behavior control description for a Web server would define reading system registry keys and directories as appropriate behavior, and modifying these same keys and directories as inappropriate behavior that should be blocked. If the CodeRed worm attacked a Web server protected by the APPFIRE™ firewall 201, its attempts to modify the registry to open security holes would be denied. Similarly, its attempts to create programs in the sensitive root directories would also be denied.

Further, most Web servers have no reason to initiate outbound HTTP connections. Instead, they listen for incoming HTTP connections and respond. The BCD 305 would define network access for listening and responding as appropriate behavior and network access for initiating connections to other systems as inappropriate behavior. When the CodeRed worm tried to spread itself, the APPFIRE™ behavior control engine 302 would deny attempts to create a network connection. If there were legitimate reasons for a particular Web server to initiate connections to remote systems, the BCD 305 could be customized to list specific systems to which connections should be permitted. Alternatively, the BCD 305 could specify a maximum permitted rate for creating outbound connections. When the Web server's behavior exceeds this rate, the APPFIRE™ behavior control engine 302 can deny further connections.

This example illustrates how a BCD 305 can define the appropriate behavior of a Web server and contain the damage that an attack like the CodeRed worm can cause. The APP-FIRE™ firewall 201 does not prevent the worm from infecting the Web server, but it does prevent the worm from using the compromised Web server to damage critical server or operating system resources. Note that since the defacing of Web pages happens entirely in memory, it does not result in behavior the APPFIRE™ firewall 201 behavior control engine 302 controls. So the CodeRed worm would be able to deface Web pages, but only until the vulnerability is closed and the system rebooted.

The BCD 305 defines behaviors in terms of what is appropriate and inappropriate for a Web server. As such, the BCD 305 prevents damage from any attack that attempts to modify system registry keys or directories. It is not limited simply to the CodeRed-specific pattern of damage.

9.0 APPFIRE™ Case Studies

9.1 Protecting Against Malicious Employees

A typical business maintains a large amount of critical and sensitive data on internal servers. If this data were destroyed or even disclosed, the business would suffer considerable damage. Attacks on this data from outside are one concern, but attacks by malicious employees are also not unusual.

The critical data must be shared by groups of employees so the internal servers containing it must be connected to the company network. Unfortunately, this is the same network that the malicious employee has access to. Consequently, the internal servers are subject to attack. A malicious employee can take advantage of vulnerabilities in the basic operating system software and applications, just as an outside attacker might. He or she can also use additional attack methods, such as stealing passwords or using unlocked, logged-in terminals.

The result is the IT department must spend at least as much effort to deploy anti-virus signature updates and application or OS patches on internal servers as on external servers. This is an on-going, time-consuming task diverting IT resources from more constructive work. Furthermore, the possibility of additional types of attacks requires additional effort to monitor internal servers and enforce proper user behavior. The APPFIRE™ firewall 201 provides intrusion prevention protection based on application behavior. Rather than define a set of signatures describing specific attacks against specific vulnerabilities, an APPFIRE™ firewall 201 policy describes the permitted or denied behaviors of an application. If the application attempts denied behaviors, the APPFIRE™ firewall 201 stops the action.

The APPFIRE™ firewall 201 provides intrusion prevention protection based on application behavior. Rather than define a set of signatures describing specific attacks against specific vulnerabilities, a BCD describes the permitted or denied behaviors of an application. If the application attempts denied behaviors, the APPFIRE™ firewall 201 stops the action.

Pre-defined behavior policies are provided for common operating systems and servers, including Windows and the IIS server. A company desiring to protect its internal Windows servers would deploy The APPFIRE™ firewall 201 on those servers and apply the pre-defined Windows OS policy. This BCD describes the permitted behavior of the base Windows operating system components. It also contains options for common Windows server features and applications. The IT department can select those features and applications required on the server and the APPFIRE™ firewall 201 adjusts the policy appropriately.

The pre-defined Windows server policy includes descriptions of the permitted behavior of interactive applications, such as MS Office and e-mail applications. On a server system, these applications are restricted to reading or writing a very small set of files, blocking their use to steal or damage critical business data. Certain applications, such as e-mail readers, can be prevented from running altogether. Users would have to read their email from their workstation.

By having a security solution that is independent of the means of attack, the IT department is no longer under severe pressure to deploy anti-virus signature updates and test and install patches immediately. IT can establish a regular maintenance schedule for the updates and patches and be confident that the APPFIRE™ firewall 201 protects the un-patched application from damaging the system in the meantime. In addition, by confining the behavior of interactive applications running on the servers, the APPFIRE™ firewall 201 goes beyond protecting against application bugs or viruses, and blocks the use of typical applications in undesirable ways.

9.2 Protecting Custom Applications

Standard Web, Transaction and Mail servers don't solve every business problem. Most businesses have unique needs and they often require custom applications to meet them. These custom applications are just as critical to businesses as the standard servers and applications they use. Attacks on and damage to custom applications cost businesses money.

Not only are the custom applications just as critical, if they are deployed on public networks, they are also just as vulnerable to attack. Even if the custom application is perfectly implemented, a flawed operating system foundation will make it vulnerable. So the IT department must spend the same effort on anti-virus updates and OS patches that it would for a standard server with no custom application.

Of course, custom applications are not built perfectly and have vulnerabilities of their own. These vulnerabilities are not going to be discovered and fixed as readily as those of more popular applications because there are fewer people looking for them. In fact, it's likely that the only people looking for them are attackers. This means they could be found and exploited for longer periods of time than flaws in standard software. This becomes an additional concern for the IT department.

The APPFIRE™ firewall 201 provides intrusion prevention protection based on application behavior. Rather than define a set of signatures describing specific attacks against specific vulnerabilities, a BCD describes the permitted or denied behaviors of an application. If the application attempts denied behaviors, the APPFIRE™ firewall 201 stops the action. This behavior control can be applied to custom applications just as easily as to popular applications.

A business desiring to protect a custom application would define a custom behavior policy. The APPFIRE™ firewall 201 provides pre-defined behavior policies for common operating systems and servers. The custom policy would begin with a pre-defined OS policy. This policy controls the behavior of the base operating system components and provides the custom application with a more secure platform for execution.

The custom policy is completed by writing behavior controls for the custom application. The policy author first analyzes the behavior of the custom application, combining design knowledge of the application (if available) with profiles of actual behavior. Using this data, the author uses the APPFIRE™ Authoring Environment to create a new behavior control description for the custom application. Finally, the author modifies the Process Binding Rules 306 to map the custom application to the BCD 305. The resulting policy contains both the pre-defined OS controls and the custom controls for the custom application.

Custom applications often co-exist with standard applications, such as Web servers. The pre-defined policies include behavior controls for standard applications. These behavior controls confine each application so that a problem in one application cannot undermine another application. The custom application is protected from intrusions into the standard applications and vice versa.

By having a security solution that is independent of the means of attack, the IT department is no longer under severe pressure to deploy anti-virus signature updates and test and install OS patches immediately. IT can establish a regular maintenance schedule for the updates and patches and be confident that the APPFIRE™ firewall 201 protects the un-patched OS from damaging the custom application in the meantime. The worry of vulnerabilities in the custom application is reduced because the behavior of the application is controlled. Vulnerabilities cannot cause it to damage other applications on the system and vulnerabilities in other applications cannot cause them to damage the custom application.

9.3 Protecting Public IIS Servers

Businesses use IIS Web servers for a variety of reasons. Some simply display corporate information to the public, e.g., product marketing documents, corporate press releases, etc. Others are integral parts of the company's daily operations, e.g., on-line stores, customer support servers, etc. In either case, attacks on the IIS server cost the business money. Customers cannot find the information they need and cannot interact with the company to do business.

Since the purpose of these IIS Web servers is to interact with the public, they must be connected to a public network. Consequently, the servers are subject to constant attack. The types of attacks are always changing, as evidenced by the stream of virus announcements from the anti-virus vendors and of patch notifications from Microsoft. The attacks and patches are not limited just to the Web server software. Vulnerabilities in the basic Windows operating system software are also common and just as serious.

The result is a constant stream of work for the IT department to find, test and deploy anti-virus signature updates and application or OS patches. This is a time consuming task diverting IT resources from more constructive work. Since the solutions are targeted at specific attacks on specific vulnerabilities, they generally don't help stop new attack methods.

The APPFIRE™ firewall 201 provides intrusion prevention protection based on application behavior. Rather than define a set of signatures describing specific attacks against specific vulnerabilities, a policy describes the permitted or denied behaviors of the applications on the system. If the application attempts denied behaviors, the APPFIRE™ firewall 201 stops the action.

Pre-defined behavior policies for common operating systems and servers are provided, including Windows and the IIS server. A company desiring to protect its public IIS Web servers would deploy the APPFIRE™ firewall 201 on those servers and apply the pre-defined IIS server policy. This policy describes the permitted behavior of the IIS server itself and of the base Windows operating system components. If an attack is launched against the IIS server, and the attacker tries to fool or force the Web application to access resources outside of its permitted set, the APPFIRE™ firewall 201 will see the attempt and block it. Attacks against the Windows OS components are stopped in a similar manner.

By having a security solution that is independent of the means of attack, the IT department is no longer under severe pressure to deploy anti-virus signature updates and test and install patches immediately. IT can establish a regular maintenance schedule for the updates and patches and be confident that the APPFIRE™ firewall 201 protects the un-patched application from damaging the system in the meantime.

The IIS server software has a large number of features. Besides providing Web services, it can provide FTP and News services, dynamic page generation, etc. Vulnerabilities are usually specific to a feature. The APPFIRE™ firewall 201 pre-defined policies provide options to specify which IIS server features are required by the business. For features that are not required, the policy can deny access to resources needed only by that specific feature. In this way, a business can customize the behavior policy for their specific needs and get even more protection than from a completely generic policy.

9.4 Managing Policy in Large Organizations

In large organizations, responsibility for managing critical server systems is often spread across several groups. It is not unusual for one central group to be responsible for translating the organization's general security policy into specific security configurations for individual applications. The responsibility for day-to-day operations of the servers is often held by another group, or possibly several groups at several sites. Sometimes this division of responsibilities is a result of the availability of different skills sets; sometimes a result of organizational policy or legal restrictions.

With responsibility divided in this way, each group needs to have confidence that it has the means to do their job without interference, intentional or accidental, from the other groups. The policy group wants to configure applications in a way that meets the organization's general policy and wants to be sure the operational group can't violate it. The operational group wants to be able to reconfigure applications as necessary to keep the servers running. It needs to react quickly to new circumstances or problems and doesn't want to be prevented from changing configurations to do so.

The APPFIRE™ firewall 201 provides intrusion prevention protection based on application behavior. Rather than define a set of signatures describing specific attacks against specific vulnerabilities, a policy describes the permitted or denied behaviors of an application. If the application attempts denied behaviors, the APPFIRE™ firewall 201 stops the action. Pre-defined behavior policies for common operating systems and server applications are provided.

The APPFIRE™ Manager 401 provides powerful tools to support a two-tiered management system. The operational group may not have detailed knowledge of application behavior. The Enterprise Manager accounts for this and provides a Simple View (see FIG. 5) of the policy that shows options in terms of application features rather than application behavior. The policy group, on the other hand, likely has detailed knowledge of application behavior. It can use the Authoring Environment, with its more sophisticated Graphical View (see FIGS. 7A-8B) to understand a pre-defined policy or create a custom policy for the organization.

The policy group can customize a pre-defined policy in several ways. If some or all of the Simple View options could violate the organization's general policy, the policy group can select a safe choice for each option and remove them as options from the policy. This eliminates the possibility of the operational group making a wrong choice. If the operational group needs some additional options not provided by the pre-defined policy, the policy group can create new options in the policy. The Authoring Environment provides the ability to define options for the Simple View and define the detailed behavior controls to be used for each choice. The policy group would define these new options such that any choice is in accordance with the organization's policy. Finally, if the organization has custom applications, the policy group can create BCDs for these applications and include them in the custom policy. This ensures that the custom applications are controlled in a consistent way across the organization.

The resulting custom policy satisfies both groups. The policy group has defined the policy to support the organization's general security policy. Any choices that would violate the organization's policy have been removed and any special circumstances have been accounted for by additions to the policy. The operational group is satisfied because the custom policy contains the flexibility it needs to deal with operational issues and it does not contain options that might violate the organization's general policy.

By having a security solution that is independent of the means of attack, the operational group is no longer under severe pressure to deploy anti-virus signature updates or install patches immediately. It can establish a regular maintenance schedule for the updates and patches and be confident that the APPFIRE™ firewall 201 protects the un-patched systems in the meantime.

It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

9.5 Reducing the Time-Criticality of Patches

Many large organizations have written policies that require application of any security-related operating system or application patches as soon as they are released. Microsoft released 72 critical security patches during 2002. This means that administrators in a large organization may have had to apply more than one patch a week in order to comply with the written policies.

Typically patch descriptions released by vendors describe the problem, the possible consequences if an attacker exploits the problem and include a list of conditions under which the patch would or would not be required. For example, "If you don't have application A installed, you don't need this patch." Administrators can use these conditions to determine whether any particular patch is relevant to their specific configurations and in this way reduce the number of patches they actually have to apply.

By installing APPFIRE™ Agents 304 on their critical systems, administrators can reduce the number of patch conditions that apply to those systems. The pre-defined APPFIRE™ policies confine many standard operating system services to only the behaviors necessary for their required features. Thus, a patch that fixes a problem that would allow an attacker to cause an operating system service to exhibit a non-normal behavior would not be critical on an APPFIRE™-protected system. APPFIRE™ would stop the undesired behavior.

This does not mean patches should never be applied to APPFIRE™ Agent systems. But it does mean that fewer patches are critical and would need to be applied immediately after being released. This allows administrators to group patches and schedule patch applications less frequently and at more convenient times.

It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A system comprising:
a plurality of host computers storing program instructions executable to implement:
a control manager;
a plurality of agents, wherein each host computer has installed thereon a respective agent of the plurality of agents, and wherein each respective agent includes a behavior control engine configured to group one or more processes of one or more applications executing on the corresponding host computer into one or more process sets according to a corresponding process binding module that includes rules that map a given process to one of the process sets, and further configured to restrict execution of the processes of each process set according to a corresponding behavior control description module; and
a management infrastructure configured to manage a central storage of the corresponding behavior control description module of each of the plurality of agents, wherein the management infrastructure includes an interface configured to facilitate loading of the corresponding process binding module and the corresponding behavior control description module into the behavior control engine of each agent and an interface configured to facilitate modifications to the corresponding process binding module and the corresponding behavior control description module of each of the plurality of agents modules by the control manager.

2. The system as recited in claim 1 wherein the behavior control engine of each agent is loaded into an operating system kernel of the corresponding host computer.

3. The system as recited in claim 1 wherein the behavior control engine of each agent is configured to restrict execution of the processes of each process set according to instruction code included within the corresponding behavior control description module.

4. The system as recited in claim 3 wherein the instruction code is specified in XML (extensible mark-up language) code.

5. The system as recited in claim 3 wherein the behavior control engine of each agent is configured to restrict execution of the processes of each process set by monitoring execution of the processes and detecting accesses to and use of particular system resources specified by the corresponding behavior control description module.

6. The system as recited in claim 1 wherein the process binding module includes rules that map a given process to one of the process sets dynamically based on operations performed by the given process.

7. The system as recited in claim 6 wherein the process binding module includes rules that map a given process to one of the process sets based on an ancestry of the given process.

8. The system as recited in claim 6 wherein each process set is defined by attributes of a process including any one or more of: a pathname, process identity, process privileges, and process command line arguments.

9. The system as recited in claim 1 wherein the management infrastructure is further configured to manage a central storage of the corresponding process binding module of each of the plurality of agents.

10. The system as recited in claim 1 wherein the plurality of agents and the management infrastructure are configured to support multiple operating system platforms.

11. The system as recited in claim 1 wherein the control manager is configured to allow an administrator to control a configuration of each of the plurality of agents.

12. The system as recited in claim 1 wherein the program instructions are further executable to implement a profiler module configured to generate an initial behavior control description module used to create the corresponding behavior control description module of at least one of the agents.

13. A storage medium storing program instructions executable to implement:
- a control manager;
- a plurality of agents, wherein each agent is configured to be executed on a corresponding host computer of a plurality of host computers, and wherein each respective agent includes a behavior control engine configured to group one or more processes of one or more applications executing on the corresponding host computer into one or more process sets according to a corresponding process binding module that includes rules that map a given process to one of the process sets, and further configured to restrict execution of the processes of each process set according to a corresponding behavior control description module; and
- a management infrastructure configured to manage a central storage of the corresponding behavior control description module of each of the plurality of agents, wherein the management infrastructure includes an interface configured to facilitate loading of the corresponding process binding module and the corresponding behavior control description module into the behavior control engine of each agent and an interface configured to facilitate modifications to the corresponding process binding module and the corresponding behavior control description module of each of the plurality of agents modules by the control manager.

14. The storage medium as recited in claim 13 wherein the behavior control engine of each agent is configured to be loaded into an operating system kernel of the corresponding host computer.

15. The storage medium as recited in claim 13 wherein the behavior control engine of each agent is configured to restrict execution of the processes of each process set according to instruction code included within the corresponding behavior control description module.

16. The storage medium as recited in claim 15 wherein the instruction code is specified in XML (extensible mark-up language) code.

17. The storage medium as recited in claim 15 wherein the behavior control engine of each agent is configured to restrict execution of the processes of each process set by monitoring execution of the processes and detecting accesses to and use of particular system resources specified by the corresponding behavior control description module.

18. The storage medium as recited in claim 13 wherein the process binding module includes rules that map a given process to one of the process sets dynamically based on operations performed by the given process.

19. The storage medium as recited in claim 18 wherein the process binding module includes rules that map a given process to one of the process sets based on an ancestry of the given process.

20. The storage medium as recited claim 18 wherein each process set is defined by attributes of a process including any one or more of: a pathname, process identity, process privileges, and process command line arguments.

21. The storage medium as recited in claim 13 wherein the management infrastructure is further configured to manage a central storage of the corresponding process binding module of each of the plurality of agents.

22. The storage medium as recited in claim 13 wherein the plurality of agents and the management infrastructure are configured to support multiple operating system platforms.

23. The storage medium as recited in claim 13 wherein the control manager is configured to allow an administrator to control a configuration of each of the plurality of agents.

24. The storage medium as recited in claim 13 wherein the program instructions are further executable to implement a profiler module configured to generate an initial behavior control description module used to create the corresponding behavior control description module of at least one of the agents.

* * * * *

UNITED STATES PATENT AND TRADEMARK OFFICE
CERTIFICATE OF CORRECTION

PATENT NO. : 7,657,927 B2
APPLICATION NO. : 11/009704
DATED : February 2, 2010
INVENTOR(S) : Tajalli et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1414 days.

Signed and Sealed this

Thirtieth Day of November, 2010

David J. Kappos
*Director of the United States Patent and Trademark Office*